US012362488B2

(12) United States Patent
Garrido Lopez et al.

(10) Patent No.: US 12,362,488 B2
(45) Date of Patent: Jul. 15, 2025

(54) ELECTRONIC DEVICES WITH DIELECTRIC RESONATOR ANTENNAS

(71) Applicant: Apple Inc., Cupertino, CA (US)

(72) Inventors: David Garrido Lopez, San Jose, CA (US); Panagiotis Theofanopoulos, Cupertino, CA (US); Harish Rajagopalan, San Jose, CA (US); Subramanian Ramalingam, San Jose, CA (US); Forhad Hasnat, Milpitas, CA (US); Rodney A Gomez Angulo, Santa Clara, CA (US); Robert Scritzky, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 18/167,567

(22) Filed: Feb. 10, 2023

(65) Prior Publication Data

US 2024/0113436 A1 Apr. 4, 2024

Related U.S. Application Data

(60) Provisional application No. 63/412,768, filed on Oct. 3, 2022.

(51) Int. Cl.

*H01Q 9/04* (2006.01)
*H01Q 1/24* (2006.01)
*H01Q 3/30* (2006.01)

(52) U.S. Cl.

CPC .......... *H01Q 9/0485* (2013.01); *H01Q 1/241* (2013.01); *H01Q 1/243* (2013.01); *H01Q 3/30* (2013.01)

(58) Field of Classification Search

CPC .......... H01Q 1/241; H01Q 1/243; H01Q 3/30; H01Q 9/0485

See application file for complete search history.

(56) References Cited

U.S. PATENT DOCUMENTS 6,496,147 B1 12/2002 Kirino
10,312,601 B2 6/2019 Zhai et al.
(Continued)

FOREIGN PATENT DOCUMENTS

CN 112928478 A * 6/2021 ............ H01Q 25/04
CN 113506989 A 10/2021
(Continued)

OTHER PUBLICATIONS

S. Sibo, "Design of Step-Shaped Dielectric Resonator Antenna Element," 2022 IEEE 10th Asia-Pacific Conference on Antennas and Propagation (APCAP), Xiamen, China, 2022, pp. 1-2, doi: 10.1109/APCAP56600.2022.10068963. (Year: 2022).*

*Primary Examiner* — Dameon E Levi
*Assistant Examiner* — Leah Rosenberg
(74) *Attorney, Agent, or Firm* — Treyz Law Group, P.C.; Tianyi He

(57) ABSTRACT

An electronic device may be provided with a phased antenna array that radiates at a frequency greater than 10 GHz. The array may include a first set of dielectric resonator antennas arranged in a first row and a second set of dielectric resonator antennas in a second row offset from the first row. Each dielectric resonator antenna may have dielectric resonating element with a base portion and a stepped portion. The stepped portions of the antennas in the first set may be arranged to be distant from the stepped portions of the antennas in the second set. The antennas in the first set may be arranged to be more distant from an electronic device sidewall than the antennas in the second set. Configured in this manner, the array may exhibit reduced inter-coupling between dielectric resonator antennas in the first set and dielectric resonator antennas in the second set.

20 Claims, 13 Drawing Sheets

(56) References Cited

U.S. PATENT DOCUMENTS

| | | | | |
|---|---|---|---|---|
| 10,886,619 | B2 | 1/2021 | Avser et al. | |
| 10,978,797 | B2 | 4/2021 | Edwards et al. | |
| 11,081,804 | B2 | 8/2021 | Mizunuma et al. | |
| 11,205,926 | B2 | 12/2021 | Shrivastava et al. | |
| 11,296,407 | B2 | 4/2022 | Sanford et al. | |
| 2012/0306713 | A1 | 12/2012 | Raj et al. | |
| 2019/0221940 | A1 | 7/2019 | Pance et al. | |
| 2020/0280131 | A1* | 9/2020 | Avser | H01Q 3/2658 |
| 2022/0006486 | A1 | 1/2022 | Rajagopalan et al. | |
| 2022/0102867 | A1 | 3/2022 | Irci et al. | |
| 2023/0090668 | A1* | 3/2023 | Theofanopoulos | H04M 1/0266 343/720 |
| 2024/0186723 | A1* | 6/2024 | Yamada | H01Q 21/08 |
| 2024/0332806 | A1* | 10/2024 | Leung | H01Q 15/24 |

FOREIGN PATENT DOCUMENTS

| | | | | | |
|---|---|---|---|---|---|
| CN | 113964532 | A | * | 1/2022 | |
| CN | 113506989 | B | * | 4/2024 | H01Q 1/002 |
| KR | 20190010448 | A | | 1/2019 | |
| WO | 2018107478 | A1 | | 6/2018 | |

* cited by examiner

ELECTRONIC DEVICES WITH DIELECTRIC RESONATOR ANTENNAS

This application claims the benefit of U.S. provisional patent application No. 63/412,768, filed on Oct. 3, 2022, which is hereby incorporated by reference herein in its entirety.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies can support high throughputs but may raise significant challenges.

SUMMARY

An electronic device may be provided with wireless circuitry and a housing. The housing may have peripheral conductive housing structures and a rear wall. A display may be mounted to the peripheral conductive housing structures opposite the rear wall. A phased antenna array may radiate at a frequency greater than 10 GHz through the display.

The phased antenna array may include a dielectric resonator antenna having a dielectric column that forms a dielectric resonating element. The dielectric column may have a first surface mounted to a circuit board. The dielectric column may have a second surface that faces the display. The dielectric column may be fed at or adjacent the first surface (e.g., by a feed probe). The dielectric column may have planar and non-planar sidewalls. The planar sidewalls can extend across a base portion of the dielectric column and a stepped portion of the dielectric column on the base portion.

The phased antenna array may include dielectric columns staggered between first and second rows. Dielectric columns configured to radiate at a relatively high frequency may be arranged in the first row. Dielectric columns configured to radiate at a relatively low frequency may be arranged in the second row. The stepped portion of each dielectric column in the first row may have a stepped portion on a side of the dielectric column that is more distant from the second row of dielectric columns. The stepped portion of each dielectric column in the second row may have a stepped portion on a side of the dielectric column that is more distant from the first row of dielectric columns. Configured in this manner, dielectric columns in different rows may exhibit reduced inter-coupling and suppress the generation of undesired radio-frequency signals via secondary radiators.

The phased antenna array may be arranged along a conductive sidewall of the housing. Each dielectric column in the first row may be more distant from the conductive sidewall than each dielectric column in the second row.

DETAILED DESCRIPTION

Figure 1:
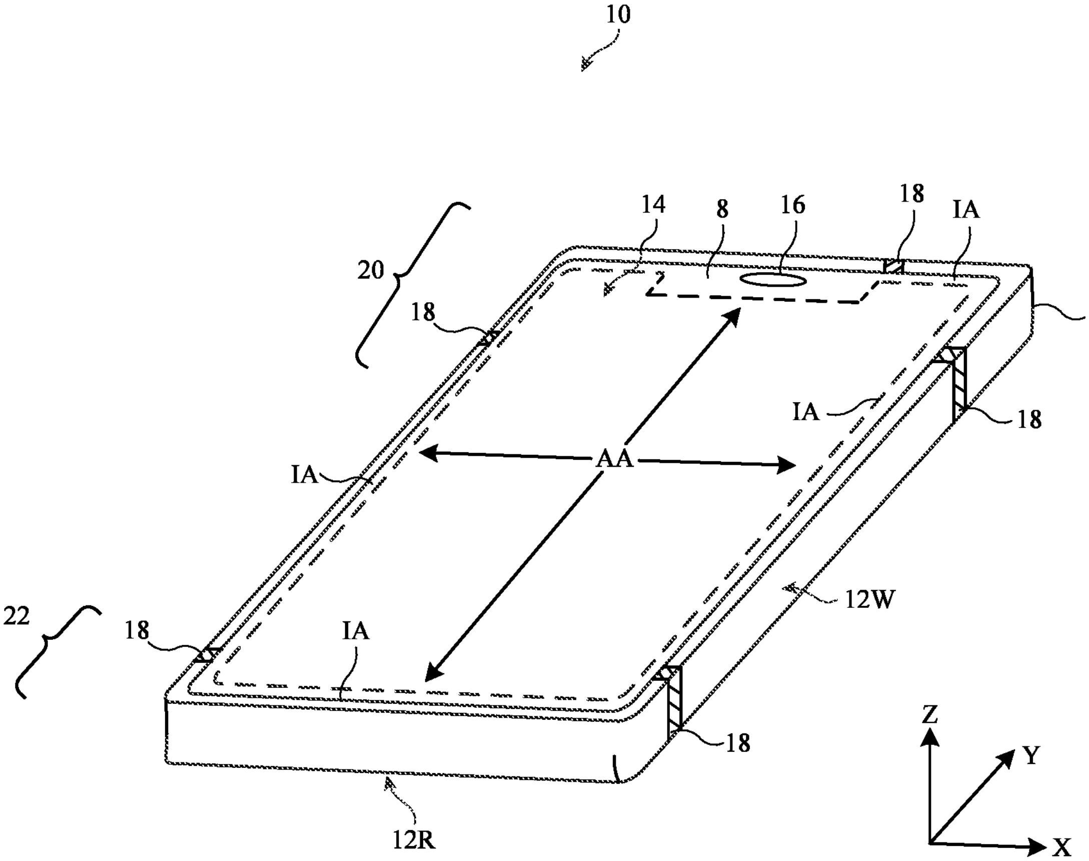
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region or notch that extends into active area AA (e.g., at speaker port 16). Active area AA may, for example, be defined by the lateral area of a display module for display 14 (e.g., a display module that includes pixel circuitry, touch sensor circuitry, etc.).

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
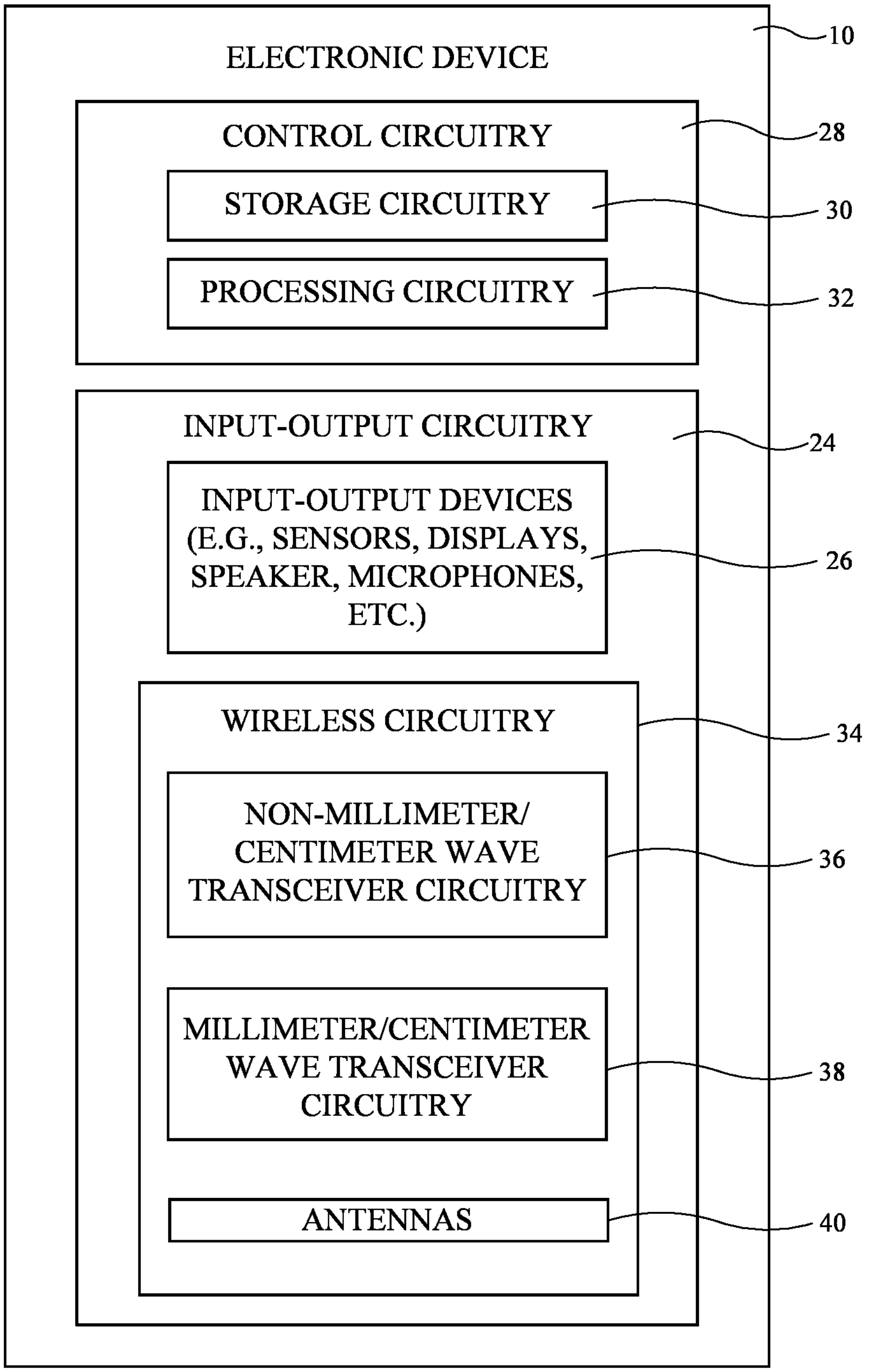
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), graphics processing units (GPUs), etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry or other control components that form a part of wireless circuitry 34.

Wireless circuitry 34 may include millimeter and centimeter wave transceiver circuitry such as millimeter/centimeter wave transceiver circuitry 38. Millimeter/centimeter wave transceiver circuitry 38 may support communications at frequencies between about 10 GHz and 300 GHz. For example, millimeter/centimeter wave transceiver circuitry 38 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 38 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 38 may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz. Millimeter/centimeter wave transceiver circuitry 38 may be formed from one or more integrated circuits (e.g., multiple integrated circuits mounted on a common printed circuit in a system-in-package device, one or more integrated circuits mounted on different substrates, etc.).

Millimeter/centimeter wave transceiver circuitry 38 (sometimes referred to herein simply as transceiver circuitry 38 or millimeter/centimeter wave circuitry 38) may perform spatial ranging operations using radio-frequency signals at millimeter and/or centimeter wave frequencies that are transmitted and received by millimeter/centimeter wave transceiver circuitry 38. The received signals may be a version of the transmitted signals that have been reflected off of external objects and back towards device 10. Control circuitry 28 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 28 may also process the transmitted and received signals to identify a two or three-dimensional spatial location of the external objects relative to device 10.

Spatial ranging operations performed by millimeter/centimeter wave transceiver circuitry 38 are unidirectional. If desired, millimeter/centimeter wave transceiver circuitry 38 may also perform bidirectional communications with external wireless equipment such as external wireless equipment 10 (e.g., over a bi-directional millimeter/centimeter wave wireless communications link). The external wireless equipment may include other electronic devices such as electronic device 10, a wireless base station, wireless access point, a wireless accessory, or any other desired equipment that transmits and receives millimeter/centimeter wave signals. Bidirectional communications involve both the transmission of wireless data by millimeter/centimeter wave transceiver circuitry 38 and the reception of wireless data that has been transmitted by external wireless equipment. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 34 may include transceiver circuitry for handling communications at frequencies below 10 GHz such as non-millimeter/centimeter wave transceiver circuitry 36. For example, non-millimeter/centimeter wave transceiver circuitry 36 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by the radio-frequency transceiver circuitry may sometimes be referred to herein as frequency bands or simply as "bands," and may span corresponding ranges of frequencies. Non-millimeter/centimeter wave transceiver circuitry 36 and millimeter/centimeter wave transceiver circuitry 38 may each include one or more integrated circuits, power amplifier circuitry, low-noise input amplifiers, passive radio-frequency components, switching circuitry, transmission line structures, and other circuitry for handling radio-frequency signals.

In general, the transceiver circuitry in wireless circuitry 34 may cover (handle) any desired frequency bands of interest. As shown in FIG. 2, wireless circuitry 34 may include antennas 40. The transceiver circuitry may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 38 may convey radio-frequency signals over short distances that travel over a line-of-sight path. To enhance signal reception for millimeter and centimeter wave communications, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 36 and another type of antenna may be used in conveying radio-frequency signals at millimeter and/or centimeter wave frequencies for millimeter/centimeter wave transceiver circuitry 38. Antennas 40 that are used to convey radio-frequency signals at millimeter and centimeter wave frequencies may be arranged in one or more phased antenna arrays.

Figure 3:
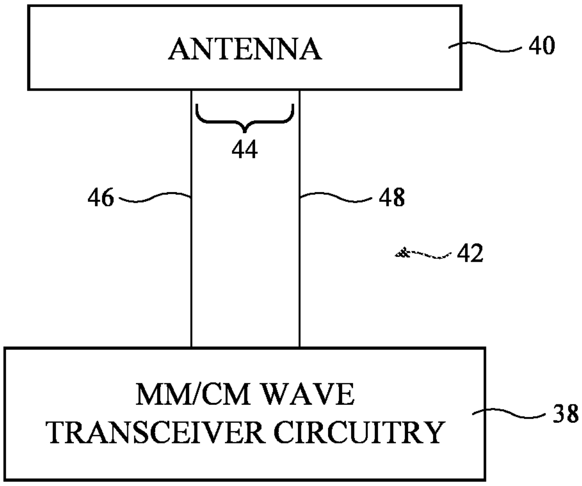
FIG. 3 is a schematic diagram of illustrative wireless circuitry in accordance with some embodiments.

A schematic diagram of an antenna 40 that may be formed in a phased antenna array for conveying radio-frequency signals at millimeter and centimeter wave frequencies is shown in FIG. 3. As shown in FIG. 3, antenna 40 may be coupled to millimeter/centimeter (MM/CM) wave transceiver circuitry 38. Millimeter/centimeter wave transceiver circuitry 38 may be coupled to antenna feed 44 of antenna 40 using a transmission line path that includes radio-frequency transmission line 42. Radio-frequency transmission line 42 may include a positive signal conductor such as signal conductor 46 and may include a ground conductor such as ground conductor 48. Ground conductor 48 may be coupled to the antenna ground for antenna 40 (e.g., over a ground antenna feed terminal of antenna feed 44 located at the antenna ground). Signal conductor 46 may be coupled to the antenna resonating element for antenna 40. For example, signal conductor 46 may be coupled to a positive antenna feed terminal of antenna feed 44 located at the antenna resonating element.

In another suitable arrangement, antenna 40 may be a probe-fed antenna that is fed using a feed probe. In this arrangement, antenna feed 44 may be implemented as a feed probe. Signal conductor 46 may be coupled to the feed probe. Radio-frequency transmission line 42 may convey radio-frequency signals to and from the feed probe. When radio-frequency signals are being transmitted over the feed probe and the antenna, the feed probe may excite the resonating element for the antenna (e.g., may excite electromagnetic resonant modes of a dielectric antenna resonating element for antenna 40). The resonating element may radiate the radio-frequency signals in response to excitation by the feed probe. Similarly, when radio-frequency signals are received by the antenna (e.g., from free space), the radio-frequency signals may excite the resonating element for the antenna (e.g., may excite electromagnetic resonant modes of the dielectric antenna resonating element for antenna 40). This may produce antenna currents on the feed probe and the corresponding radio-frequency signals may be passed to the transceiver circuitry over the radio-frequency transmission line.

Radio-frequency transmission line 42 may include a stripline transmission line (sometimes referred to herein simply as a stripline), a coaxial cable, a coaxial probe realized by metalized vias, a microstrip transmission line, an edge-coupled microstrip transmission line, an edge-coupled stripline transmission lines, a waveguide structure, combinations of these, etc. Multiple types of transmission lines may be used to form the transmission line path that couples millimeter/centimeter wave transceiver circuitry 38 to antenna feed 44. Filter circuitry, switching circuitry, impedance matching circuitry, phase shifter circuitry, amplifier circuitry, and/or other circuitry may be interposed on radio-frequency transmission line 42, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
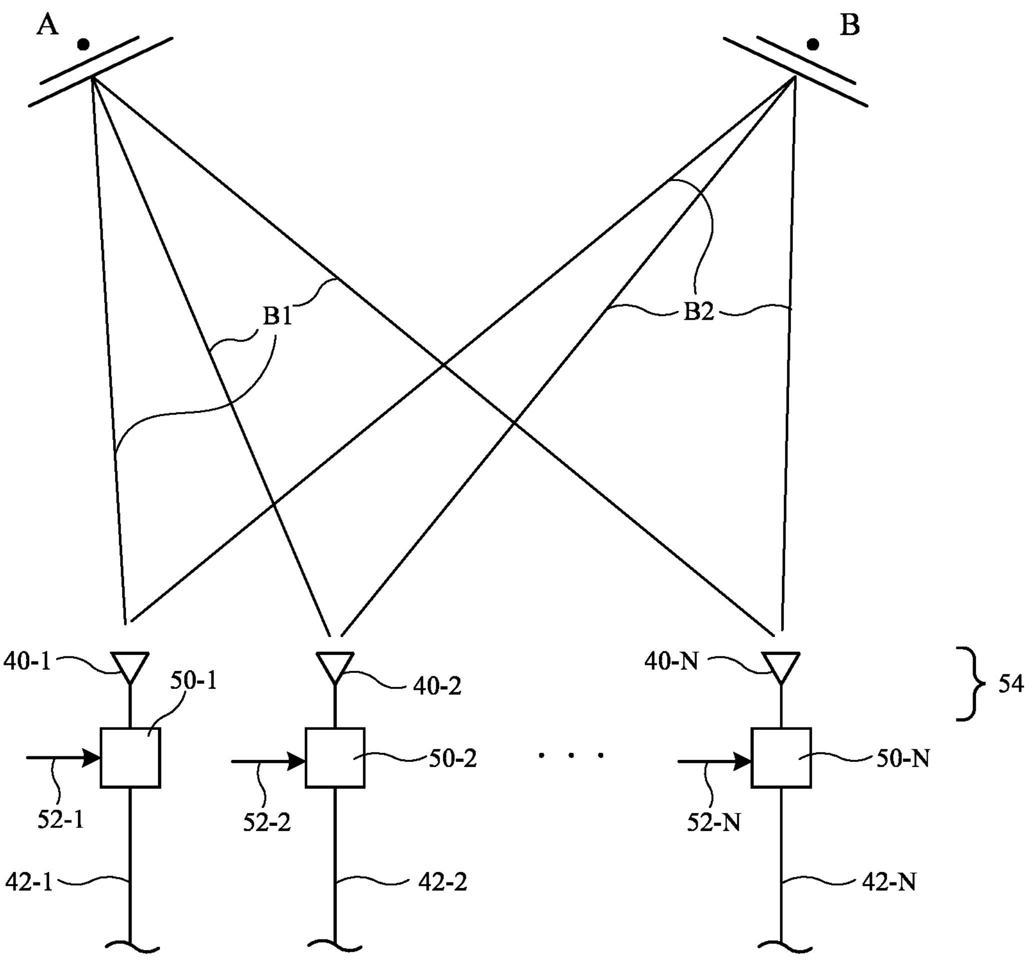
FIG. 4 is a diagram of an illustrative phased antenna array in accordance with some embodiments.

FIG. 4 shows how antennas 40 for handling radio-frequency signals at millimeter and centimeter wave frequencies may be formed in a phased antenna array. As shown in FIG. 4, phased antenna array 54 (sometimes referred to herein as array 54, antenna array 54, or array 54 of antennas 40) may be coupled to radio-frequency transmission lines 42. For example, a first antenna 40-1 in phased antenna array 54 may be coupled to a first radio-frequency transmission line 42-1, a second antenna 40-2 in phased antenna array 54 may be coupled to a second radio-frequency transmission line 42-2, an Nth antenna 40-N in phased antenna array 54 may be coupled to an Nth radio-frequency transmission line 42-N, etc. While antennas 40 are described herein as forming a phased antenna array, the antennas 40 in phased antenna array 54 may sometimes also be referred to as collectively forming a single phased array antenna.

Antennas 40 in phased antenna array 54 may be arranged in any desired number of rows and columns or in any other desired pattern (e.g., the antennas need not be arranged in a grid pattern having rows and columns). During signal transmission operations, radio-frequency transmission lines 42 may be used to supply signals (e.g., radio-frequency signals such as millimeter wave and/or centimeter wave signals) from millimeter/centimeter wave transceiver circuitry 38 (FIG. 3) to phased antenna array 54 for wireless transmission. During signal reception operations, radio-frequency transmission lines 42 may be used to supply signals received at phased antenna array 54 (e.g., from external wireless equipment or transmitted signals that have been reflected off of external objects) to millimeter/centimeter wave transceiver circuitry 38 (FIG. 3).

The use of multiple antennas 40 in phased antenna array 54 allows beam steering arrangements to be implemented by controlling the relative phases and magnitudes (amplitudes) of the radio-frequency signals conveyed by the antennas. In the example of FIG. 4, antennas 40 each have a corresponding radio-frequency phase and magnitude controller 50 (e.g., a first phase and magnitude controller 50-1 interposed on radio-frequency transmission line 42-1 may control phase and magnitude for radio-frequency signals handled by antenna 40-1, a second phase and magnitude controller 50-2 interposed on radio-frequency transmission line 42-2 may control phase and magnitude for radio-frequency signals handled by antenna 40-2, an Nth phase and magnitude controller 50-N interposed on radio-frequency transmission line 42-N may control phase and magnitude for radio-frequency signals handled by antenna 40-N, etc.).

Phase and magnitude controllers 50 may each include circuitry for adjusting the phase of the radio-frequency signals on radio-frequency transmission lines 42 (e.g., phase shifter circuits) and/or circuitry for adjusting the magnitude of the radio-frequency signals on radio-frequency transmission lines 42 (e.g., power amplifier and/or low noise amplifier circuits). Phase and magnitude controllers 50 may sometimes be referred to collectively herein as beam steering circuitry (e.g., beam steering circuitry that steers the beam of radio-frequency signals transmitted and/or received by phased antenna array 54).

Phase and magnitude controllers 50 may adjust the relative phases and/or magnitudes of the transmitted signals that are provided to each of the antennas in phased antenna array 54 and may adjust the relative phases and/or magnitudes of the received signals that are received by phased antenna array 54. Phase and magnitude controllers 50 may, if desired, include phase detection circuitry for detecting the phases of the received signals that are received by phased antenna array 54. The term "beam" or "signal beam" may be used herein to collectively refer to wireless signals that are transmitted and received by phased antenna array 54 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 50 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 50 are adjusted to produce a second set of phases and/or magnitudes for the transmitted signals, the transmitted signals will form a transmit beam as shown by beam B2 that is oriented in the direction of point B. Similarly, if phase and magnitude controllers 50 are adjusted to produce the first set of phases and/or magnitudes, radio-frequency signals (e.g., radio-frequency signals in a receive beam) may be received from the direction of point A, as shown by beam B1. If phase and magnitude controllers 50 are adjusted to produce the second set of phases and/or magnitudes, radio-frequency signals may be received from the direction of point B, as shown by beam B2.

Each phase and magnitude controller 50 may be controlled to produce a desired phase and/or magnitude based on a corresponding control signal 52 received from control circuitry 28 of FIG. 2 (e.g., the phase and/or magnitude provided by phase and magnitude controller 50-1 may be controlled using control signal 52-1, the phase and/or magnitude provided by phase and magnitude controller 50-2 may be controlled using control signal 52-2, etc.). If desired, the control circuitry may actively adjust control signals 52 in real time to steer the transmit or receive beam in different desired directions over time. Phase and magnitude controllers 50 may provide information identifying the phase of received signals to control circuitry 28 if desired.

When performing wireless communications using radio-frequency signals at millimeter and centimeter wave frequencies, the radio-frequency signals are conveyed over a line of sight path between phased antenna array 54 and external communications equipment. If the external object is located at point A of FIG. 4, phase and magnitude controllers 50 may be adjusted to steer the signal beam towards point A (e.g., to steer the pointing direction of the signal beam towards point A). Phased antenna array 54 may transmit and receive radio-frequency signals in the direction of point A. Similarly, if the external communications equipment is located at point B, phase and magnitude controllers 50 may be adjusted to steer the signal beam towards point B (e.g., to steer the pointing direction of the signal beam towards point B). Phased antenna array 54 may transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 54 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Figure 5:
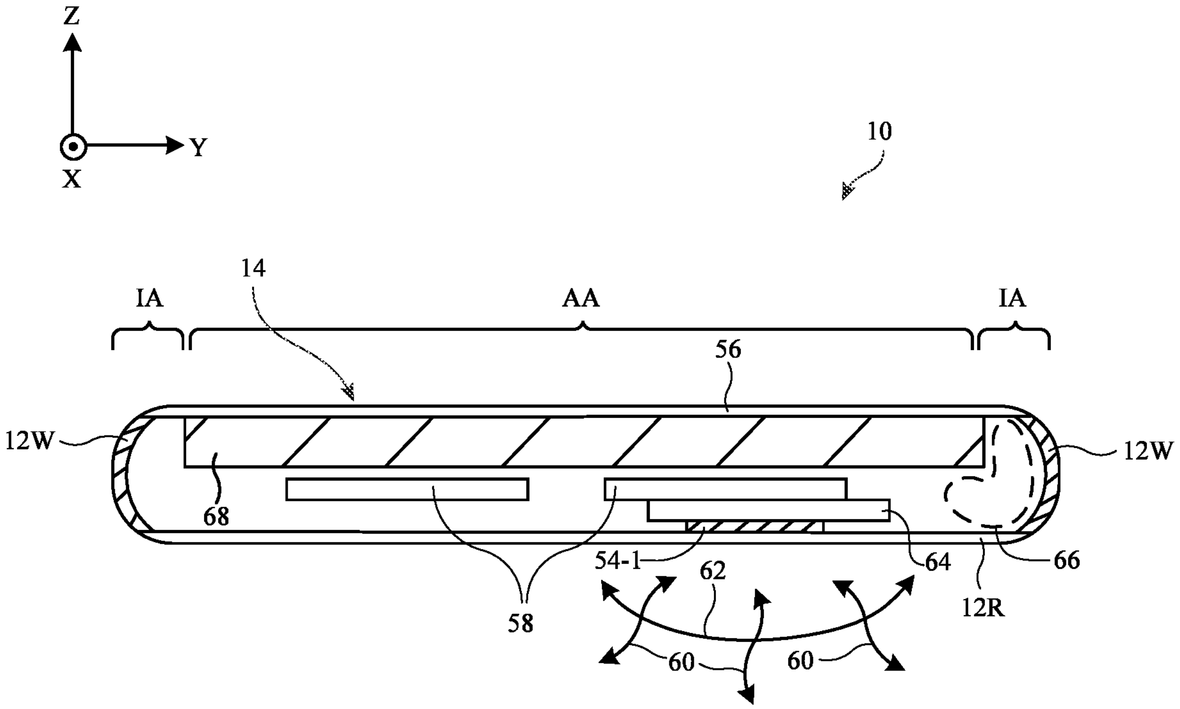
FIG. 5 is a cross-sectional side view of an illustrative electronic device having phased antenna arrays for radiating through different sides of the device in accordance with some embodiments.

FIG. 5 is a cross-sectional side view of device 10 in an example where device 10 has multiple phased antenna arrays. As shown in FIG. 5, peripheral conductive housing structures 12W may extend around the (lateral) periphery of device 10 and may extend from rear housing wall 12R to display 14. Display 14 may have a display module such as display module 68 (sometimes referred to as a display panel). Display module 68 may include pixel circuitry, touch sensor circuitry, force sensor circuitry, and/or any other desired circuitry for forming active area AA of display 14. Display 14 may include a dielectric cover layer such as display cover layer 56 that overlaps display module 68. Display module 68 may emit image light and may receive sensor input through display cover layer 56. Display cover layer 56 and display 14 may be mounted to peripheral conductive housing structures 12W. The lateral area of display 14 that does not overlap display module 68 may form inactive area IA of display 14.

Device 10 may include multiple phased antenna arrays 54 such as a rear-facing phased antenna array 54-1. As shown in FIG. 5, phased antenna array 54-1 may transmit and receive radio-frequency signals 60 at millimeter and centimeter wave frequencies through rear housing wall 12R. In scenarios where rear housing wall 12R includes metal portions, radio-frequency signals 60 may be conveyed through an aperture or opening in the metal portions of rear housing wall 12R or may be conveyed through other dielectric portions of rear housing wall 12R. The aperture may be overlapped by a dielectric cover layer or dielectric coating that extends across the lateral area of rear housing wall 12R (e.g., between peripheral conductive housing structures 12W). Phased antenna array 54-1 may perform beam steering for radio-frequency signals 60 across the hemisphere below device 10, as shown by arrow 62.

Phased antenna array 54-1 may be mounted to a substrate such as substrate 64. Substrate 64 may be an integrated circuit chip, a flexible printed circuit, a rigid printed circuit board, or other substrate. Substrate 64 may sometimes be referred to herein as antenna module 64. If desired, transceiver circuitry (e.g., millimeter/centimeter wave transceiver circuitry 38 of FIG. 2) may be mounted to antenna module 64. Phased antenna array 54-1 may be adhered to rear housing wall 12R using adhesive, may be pressed against (e.g., in contact with) rear housing wall 12R, or may be spaced apart from rear housing wall 12R.

The field of view of phased antenna array 54-1 is limited to the hemisphere under the rear face of device 10. Display module 68 and other components 58 (e.g., portions of input-output circuitry 24 or control circuitry 28 of FIG. 2, a battery for device 10, etc.) in device 10 include conductive structures. If care is not taken, these conductive structures may block radio-frequency signals from being conveyed by a phased antenna array within device 10 across the hemisphere over the front face of device 10. While an additional phased antenna array for covering the hemisphere over the front face of device 10 may be mounted against display cover layer 56 within inactive area IA, there may be insufficient space between the lateral periphery of display module 68 and peripheral conductive housing structures 12W to form all of the circuitry and radio-frequency transmission lines necessary to fully support the phased antenna array.

To mitigate these issues and provide coverage through the front face of device 10, a front-facing phased antenna array may be mounted within peripheral region 66 of device 10. The antennas in the front-facing phased antenna array may include dielectric resonator antennas. Dielectric resonator antennas may occupy less area in the X-Y plane of FIG. 5 than other types of antennas such as patch antennas and slot antennas. Implementing the antennas as dielectric resonator antennas may allow the radiating elements of the front-facing phased antenna array to fit within inactive area IA between display module 68 and peripheral conductive housing structures 12W. At the same time, the radio-frequency transmission lines and other components for the phased antenna array may be located behind (under) display module 68. While examples are described herein in which the phased antenna array is a front-facing phased antenna array that radiates through display 14, in another suitable arrangement, the phased antenna array may be a side-facing phased antenna array that radiates through one or more apertures in peripheral conductive housing structures 12W.

Figure 6:
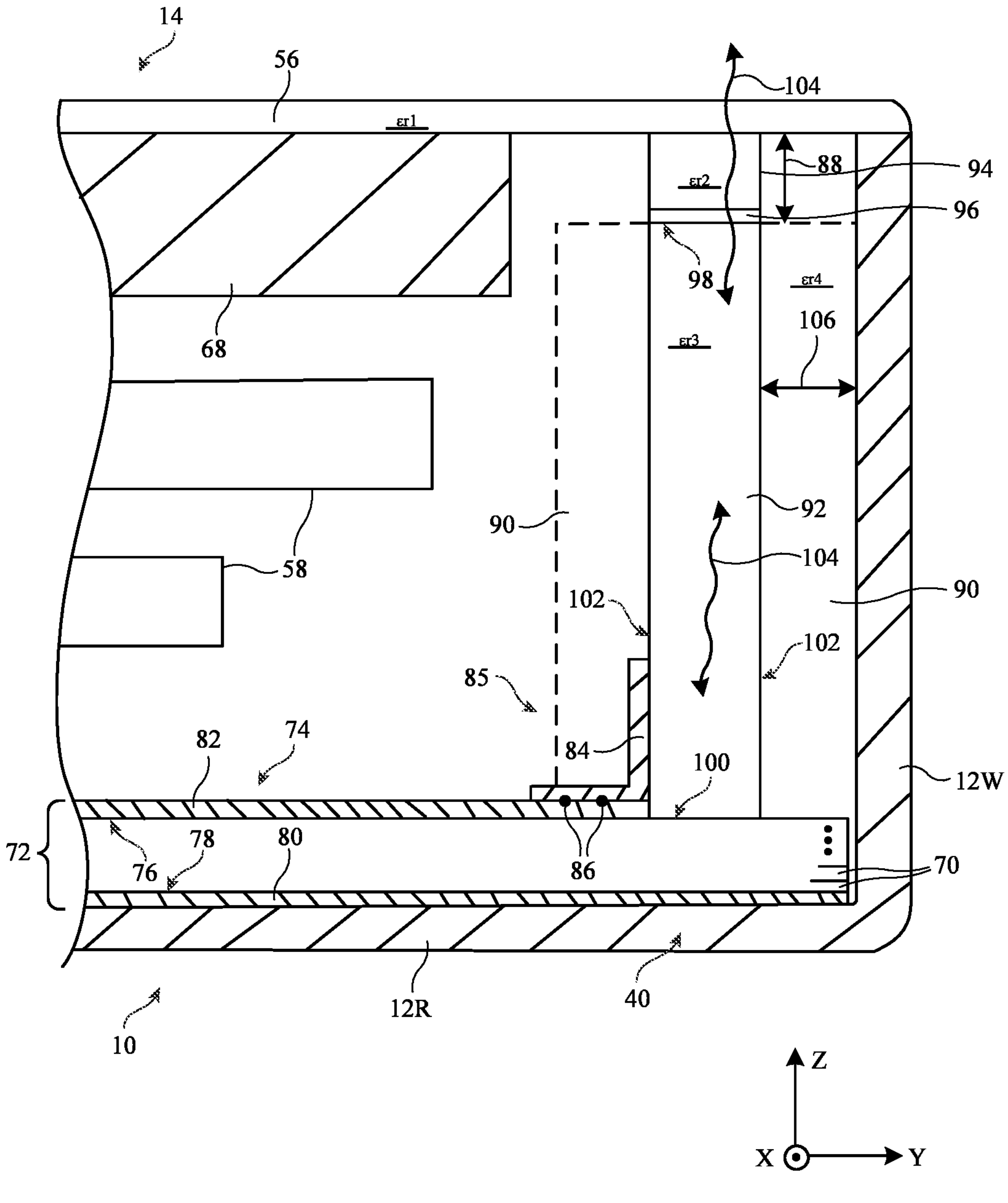
FIG. 6 is a cross-sectional side view of an illustrative dielectric resonator antenna that may be mounted within an electronic device in accordance with some embodiments.

FIG. 6 is a cross-sectional side view of an illustrative dielectric resonator antenna in a front-facing phased antenna array for device 10. As shown in FIG. 6, device 10 may include a front-facing phased antenna array having a given antenna 40 (e.g., mounted within peripheral region 66 of FIG. 5). Antenna 40 of FIG. 6 may be a dielectric resonator antenna. In this example, antenna 40 includes a dielectric resonating element 92 mounted to an underlying substrate such as circuit board 72. Circuit board 72 may be a flexible printed circuit or a rigid printed circuit board, as examples.

Circuit board 72 has a lateral area (e.g., in the X-Y plane of FIG. 6) that extends along rear housing wall 12R. Circuit board 72 may be adhered to rear housing wall 12R using adhesive, may be pressed against (e.g., placed in contact with) rear housing wall 12R, or may be separated from rear housing wall 12R. Circuit board 72 may have a first end at antenna 40 and an opposing second end coupled to the millimeter/centimeter wave transceiver circuitry in device 10 (e.g., millimeter/centimeter wave transceiver circuitry 38 of FIG. 2). In one suitable arrangement, the second end of circuit board 72 may be coupled to antenna module 64 of FIG. 5.

As shown in FIG. 6, circuit board 72 may include stacked dielectric layers 70. Dielectric layers 70 may include polyimide, ceramic, liquid crystal polymer, plastic, and/or any other desired dielectric materials. Conductive traces such as conductive traces 82 may be patterned on a top surface 76 of circuit board 72. Conductive traces such as conductive traces 80 may be patterned on an opposing bottom surface 78 of circuit board 72. Conductive traces 80 may be held at a ground potential and may therefore sometimes be referred to herein as ground traces 80. Ground traces 80 may be shorted to additional ground traces within circuit board 72 and/or on top surface 76 of circuit board 72 using conducive vias that extend through circuit board 72 (not shown in FIG. 6 for the sake of clarity). Ground traces 80 may form part of the antenna ground for antenna 40. Ground traces 80 may be coupled to a system ground in device 10 (e.g., using solder, welds, conductive adhesive, conductive tape, conductive brackets, conductive pins, conductive screws, conductive clips, combinations of these, etc.). For example, ground traces 80 may be coupled to peripheral conductive housing structures 12W, conductive portions of rear housing wall 12R, or other grounded structures in device 10. The example of FIG. 6 in which conductive traces 82 are formed on top surface 76 and ground traces 80 are formed on bottom surface 78 of circuit board 72 is merely illustrative. If desired, one or more dielectric layers 70 may be layered over conductive traces 82 and/or one or more dielectric layers 70 may be layered underneath ground traces 80.

Antenna 40 may be fed using a radio-frequency transmission line that is formed on and/or embedded within circuit board 72 such as radio-frequency transmission line 74. Radio-frequency transmission line 74 (e.g., a given radio-frequency transmission line 42 of FIG. 3) may include ground traces 80 and conductive traces 82. The portion of ground traces 80 overlapping conductive traces 82 may form the ground conductor for radio-frequency transmission line 74 (e.g., ground conductor 48 of FIG. 3). Conductive traces 82 may form the signal conductor for radio-frequency transmission line 74 (e.g., signal conductor 46 of FIG. 3) and may therefore sometimes be referred to herein as signal traces 82. Radio-frequency transmission line 74 may convey radio-frequency signals between antenna 40 and the millimeter/centimeter wave transceiver circuitry. The example of FIG. 6 in which antenna 40 is fed using signal traces 82 and ground traces 80 is merely illustrative. In general, antenna 40 may be fed using any desired transmission line structures in and/or on circuit board 72.

Dielectric resonating element 92 of antenna 40 may be formed from a column (pillar) of dielectric material mounted to top surface 76 of circuit board 72. If desired, dielectric resonating element 92 may be embedded within (e.g., laterally surrounded by) a dielectric substrate mounted to top surface 76 of circuit board 72 such as dielectric substrate 90. Dielectric resonating element 92 may have a first (bottom) surface 100 at circuit board 72 to and an opposing second (top) surface 98 at display 14. Bottom surface 100 may sometimes be referred to as bottom end 100, bottom face 100, proximal end 100, or proximal surface 100 of dielectric resonating element 92. Similarly, top surface 98 may sometimes be referred to herein as top end 98, top face 98, distal end 98, or distal surface 98 of dielectric resonating element 92. Dielectric resonating element 92 may have vertical sidewalls 102 that extend from top surface 98 to bottom surface 100. Dielectric resonating element 92 may extend along a central/longitudinal axis (e.g., parallel to the Z-axis) that runs through the center of both top surface 98 and bottom surface 100.

The operating (resonant) frequency of antenna 40 may be selected by adjusting the dimensions of dielectric resonating element 92 (e.g., in the direction of the X, Y, and/or Z axes of FIG. 6). Dielectric resonating element 92 may be formed from a column of dielectric material having dielectric constant $\varepsilon_{r3}$. Dielectric constant $\varepsilon_{r3}$ may be relatively high (e.g., greater than 10.0, greater than 12.0, greater than 15.0, greater than 20.0, between 15.0 and 40.0, between 10.0 and 50.0, between 18.0 and 30.0, between 12.0 and 45.0, etc.). In one suitable arrangement, dielectric resonating element 92 may be formed from zirconia or a ceramic material. Other dielectric materials may be used to form dielectric resonating element 92 if desired.

Dielectric substrate 90 may be formed from a material having dielectric constant $\varepsilon_{r4}$. Dielectric constant $\varepsilon_{r4}$ may be less than dielectric constant $\varepsilon_{r3}$ of dielectric resonating element 92 (e.g., less than 18.0, less than 15.0, less than 10.0, between 3.0 and 4.0, less than 5.0, between 2.0 and 5.0, etc.). Dielectric constant $\varepsilon_{r4}$ may be less than dielectric constant $\varepsilon_{r3}$ by at least 10.0, 5.0, 15.0, 12.0, 6.0, etc. In one suitable arrangement, dielectric substrate 90 may be formed from molded plastic (e.g., injection-molded plastic). Other dielectric materials may be used to form dielectric substrate 90 or dielectric substrate 90 may be omitted if desired. The difference in dielectric constant between dielectric resonating element 92 and dielectric substrate 90 may establish a radio-frequency boundary condition between dielectric resonating element 92 and dielectric substrate 90 from bottom surface 100 to top surface 98. This may configure dielectric resonating element 92 to serve as a waveguide for propagating radio-frequency signals at millimeter and centimeter wave frequencies.

Dielectric substrate 90 may have a width (thickness) 106 on each side of dielectric resonating element 92. Width 106 may be selected to isolate dielectric resonating element 92 from peripheral conductive housing structures 12W and to minimize signal reflections in dielectric substrate 90. Width 106 may be, for example, at least one-tenth of the effective wavelength of the radio-frequency signals in a dielectric material of dielectric constant $\varepsilon_{r4}$. Width 106 may be 0.4-0.5 mm, 0.3-0.5 mm, 0.2-0.6 mm, greater than 0.1 mm, greater than 0.3 mm, 0.2-2.0 mm, 0.3-1.0 mm, or greater than between 0.4 and 0.5 mm, as examples.

Dielectric resonating element 92 may radiate radio-frequency signals 104 when excited by the signal conductor for radio-frequency transmission line 74. In some scenarios, a slot is formed in ground traces on top surface 76 of flexible printed circuit, the slot is indirectly fed by a signal conductor embedded within circuit board 72, and the slot excites dielectric resonating element 92 to radiate radio-frequency signals 104. However, in these scenarios, the radiating characteristics of the antenna may be affected by how the dielectric resonating element is mounted to circuit board 72. For example, air gaps or layers of adhesive used to mount the dielectric resonating element to the flexible printed circuit can be difficult to control and can undesirably affect the radiating characteristics of the antenna. In order to mitigate the issues associated with exciting dielectric resonating element 92 using an underlying slot, antenna 40 may be fed using a radio-frequency feed probe such as feed probe 85. Feed probe 85 may form part of the antenna feed for antenna 40 (e.g., antenna feed 44 of FIG. 3).

As shown in FIG. 6, feed probe 85 may include feed conductor 84. Feed conductor 84 may include a first portion on a given sidewall 102 of dielectric resonating element 92. Feed conductor 84 may be formed from a patch of stamped sheet metal that is pressed against sidewall 102 (e.g., by biasing structures and/or dielectric substrate 90). In another suitable arrangement, feed conductor 84 may be formed from conductive traces that are patterned directly onto sidewall 102 (e.g., using a sputtering process, a laser direct structuring process, or other conductive deposition techniques). Feed conductor 84 may include a second portion coupled to signal traces 82 using conductive interconnect structures 86. Conductive interconnect structures 86 may include solder, welds, conductive adhesive, conductive tape, conductive foam, conductive springs, conductive brackets, and/or any other desired conductive interconnect structures.

Signal traces 82 may convey radio-frequency signals to and from feed probe 85. Feed probe 85 may electromagnetically couple the radio-frequency signals on signal traces 82 into dielectric resonating element 92. This may serve to excite one or more electromagnetic modes of dielectric resonating element 92 (e.g., radio-frequency cavity or waveguide modes). When excited by feed probe 85, the electromagnetic modes of dielectric resonating element 92 may configure the dielectric resonating element to serve as a waveguide that propagates the wavefronts of radio-frequency signals 104 along the length of dielectric resonating element 92 (e.g., in the direction of the Z-axis of FIG. 6), through top surface 98, and through display 14.

For example, during signal transmission, radio-frequency transmission line 74 may supply radio-frequency signals from the millimeter/centimeter wave transceiver circuitry to antenna 40. Feed probe 85 may couple the radio-frequency signals on signal traces 82 into dielectric resonating element 92. This may serve to excite one or more electromagnetic modes of dielectric resonating element 92, resulting in the propagation of radio-frequency signals 104 up the length of dielectric resonating element 92 and to the exterior of device 10 through display cover layer 56. Similarly, during signal reception, radio-frequency signals 104 may be received through display cover layer 56. The received radio-frequency signals may excite the electromagnetic modes of dielectric resonating element 92, resulting in the propagation of the radio-frequency signals down the length of dielectric resonating element 92. Feed probe 85 may couple the received radio-frequency signals onto radio-frequency transmission line 74, which passes the radio-frequency signals to the millimeter/centimeter wave transceiver circuitry. The relatively large difference in dielectric constant between dielectric resonating element 92 and dielectric substrate 90 may allow dielectric resonating element 92 to convey radio-frequency signals 104 with a relatively high antenna efficiency (e.g., by establishing a strong boundary between dielectric resonating element 92 and dielectric substrate 90 for the radio-frequency signals). The relatively high dielectric constant of dielectric resonating element 92 may also allow the dielectric resonating element 92 to occupy a relatively small volume compared to scenarios where materials with a lower dielectric constant are used.

The dimensions of feed probe 85 (e.g., in the direction of the X-axis and Z-axis of FIG. 6) may be selected to help match the impedance of radio-frequency transmission line 74 to the impedance of dielectric resonating element 92. Feed probe 85 may be located on a particular sidewall 102 of dielectric resonating element 92 to provide antenna 40 with a desired linear polarization (e.g., a vertical or horizontal polarization). If desired, multiple feed probes 85 may be formed on multiple sidewalls 102 of dielectric resonating element 92 to configure antenna 40 to cover multiple orthogonal linear polarizations at once. The phase of each feed probe may be independently adjusted over time to provide the antenna with other polarizations such as an elliptical or circular polarization if desired. Feed probe 85 may sometimes be referred to herein as feed conductor 85, feed patch 85, or probe feed 85. Dielectric resonating element 92 may sometimes be referred to herein as a dielectric radiating element, dielectric radiator, dielectric resonator, dielectric antenna resonating element, dielectric column, dielectric pillar, radiating element, or resonating element. When fed by one or more feed probes such as feed probe 85, dielectric resonator antennas such as antenna 40 of FIG. 6 may sometimes be referred to herein as probe-fed dielectric resonator antennas.

Display cover layer 56 may be formed from a dielectric material having dielectric constant $\varepsilon_{r1}$ that is less than dielectric constant $\varepsilon_{r3}$. For example, dielectric constant $\varepsilon_{r1}$ may be between about 3.0 and 10.0 (e.g., between 4.0 and 9.0, between 5.0 and 8.0, between 5.5 and 7.0, between 5.0 and 7.0, etc.). In one suitable arrangement, display cover layer 56 may be formed from glass, plastic, or sapphire. If care is not taken, the relatively large difference in dielectric constant between display cover layer 56 and dielectric resonating element 92 may cause undesirable signal reflections at the boundary between the display cover layer and the dielectric resonating element. These reflections may result in destructive interference between the transmitted and reflected signals and in stray signal loss that undesirably limits the antenna efficiency of antenna 40.

In order to mitigate effects, antenna 40 may be provided with an impedance matching layer such as dielectric matching layer 94. Dielectric matching layer 94 may be mounted to top surface 98 of dielectric resonating element 92 between dielectric resonating element 92 and display cover layer 56. If desired, dielectric matching layer 94 may be adhered to dielectric resonating element 92 using a layer of adhesive 96. Adhesive may also or alternatively be used to adhere dielectric matching layer 94 to display cover layer 56 if desired. Adhesive 96 may be relatively thin so as not to significantly affect the propagation of radio-frequency signals 104.

Dielectric matching layer 94 may be formed from a dielectric material having dielectric constant $\varepsilon_{r2}$. Dielectric constant $\varepsilon_{r2}$ may be greater than dielectric constant $\varepsilon_{r1}$ and less than dielectric constant $\varepsilon_{r3}$. As an example, dielectric constant $\varepsilon_{r2}$ may be equal to SQRT($\varepsilon_{r1}$*$\varepsilon_{r3}$), where SQRT( ) is the square root operator and "*" is the multiplication operator. The presence of dielectric matching layer 94 may allow radio-frequency signals to propagate without facing a sharp boundary between the material of dielectric constant $\varepsilon_{r1}$ and the material of dielectric constant $\varepsilon_{r3}$, thereby helping to reduce signal reflections.

Dielectric matching layer 94 may be provided with thickness 88. Thickness 88 may be selected to be approximately equal to (e.g., within 15% of) one-quarter of the effective wavelength of radio-frequency signals 104 in dielectric matching layer 94. The effective wavelength is given by dividing the free space wavelength of radio-frequency signals 104 (e.g., a centimeter or millimeter wavelength corresponding to a frequency between 10 GHz and 300 GHz) by a constant factor (e.g., the square root of $\varepsilon_{r2}$). When provided with thickness 88, dielectric matching layer 94 may form a quarter wave impedance transformer that mitigates any destructive interference associated with the reflection of radio-frequency signals 104 at the boundaries between display cover layer 56, dielectric matching layer 94, and dielectric resonating element 92. This is merely illustrative and dielectric matching layer 94 may be omitted if desired.

When configured in this way, antenna 40 may radiate radio-frequency signals 104 through the front face of device 10 despite being coupled to the millimeter/centimeter wave transceiver circuitry over a circuit board located at the rear of device 10. The relatively narrow width of dielectric resonating element 92 may allow antenna 40 to fit in the volume between display module 68, other components 58, and peripheral conductive housing structures 12W. Antenna 40 of FIG. 6 may be formed in a front-facing phased antenna array that conveys radio-frequency signals across at least a portion of the hemisphere above the front face of device 10.

Figure 7:
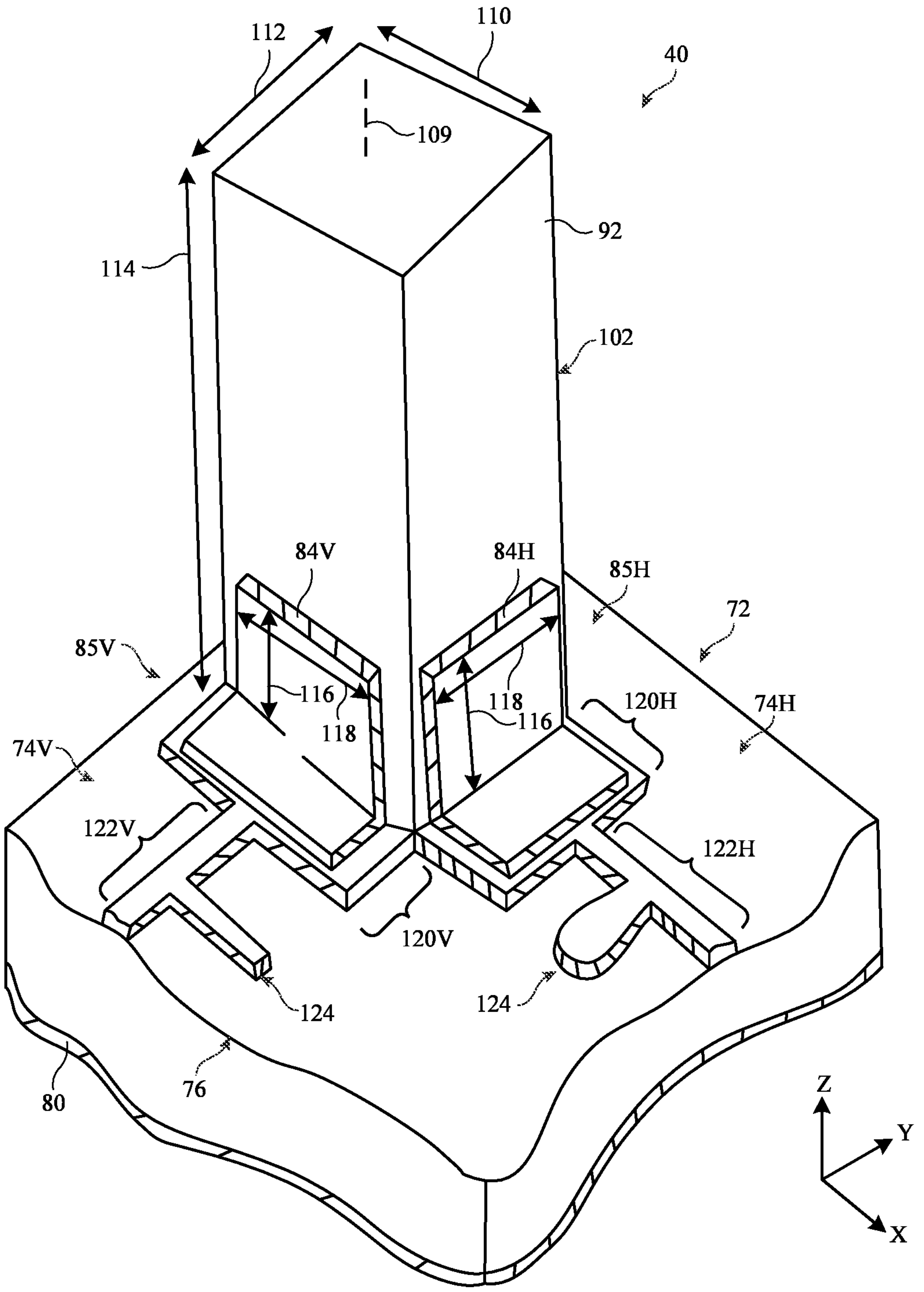
FIG. 7 is a perspective view of an illustrative dielectric resonator antenna in accordance with some embodiments.

FIG. 7 is a perspective view of the probe-fed dielectric resonator antenna of FIG. 6 in a scenario where the dielectric resonating element is fed using multiple feed probes for covering multiple polarizations. Peripheral conductive housing structures 12W, dielectric substrate 90, dielectric matching layer 94, adhesive 96, rear housing wall 12R, display 14, and other components 58 of FIG. 6 are omitted from FIG. 7 for the sake of clarity.

As shown in FIG. 7, dielectric resonating element 92 of antenna 40 (e.g., bottom surface 100 of FIG. 6) may be mounted to top surface 76 of circuit board 72. Antenna 40 may be fed using multiple feed probes 85 such as a first feed probe 85V and a second feed probe 85H mounted to dielectric resonating element 92 and circuit board 72. Feed probe 85V includes feed conductor 84V on a first sidewall 102 of dielectric resonating element 92. Feed probe 85H includes feed conductor 84H on a second (orthogonal) sidewall 102 of dielectric resonating element 92.

Antenna 40 may be fed using multiple radio-frequency transmission lines 74 such as a first radio-frequency transmission line 74V and a second radio-frequency transmission line 74H. First radio-frequency transmission line 74V may include conductive traces 122V and 120V on top surface 76 of circuit board 72. Conductive traces 122V and 120V may form part of the signal conductor (e.g., signal traces 82 of FIG. 6) for radio-frequency transmission line 74V. Similarly, second radio-frequency transmission line 74H may include conductive traces 122H and 120H on top surface 76 of circuit board 72. Conductive traces 122H and 120H may form part of the signal conductor (e.g., signal traces 82 of FIG. 6) for radio-frequency transmission line 74H.

Conductive trace 122V may be narrower than conductive trace 120V. Conductive trace 122H may be narrower than conductive trace 120H. Conductive traces 120V and 120H may, for example, be conductive contact pads on top surface 76 of circuit board 72. Feed conductor 84V of feed probe 85V may be mounted and coupled to conductive trace 120V (e.g., using conductive interconnect structures 86 of FIG. 6). Similarly, feed conductor 84H of feed probe 85H may be mounted and coupled to conductive trace 120H.

Radio-frequency transmission line 74V and feed probe 85V may convey first radio-frequency signals having a first linear polarization (e.g., a vertical polarization). When driven using the first radio-frequency signals, feed probe 85V may excite one or more electromagnetic modes of dielectric resonating element 92 associated with the first polarization. When excited in this way, wave fronts associated with the first radio-frequency signals may propagate along the length of dielectric resonating element 92 (e.g., along central/longitudinal axis 109) and may be radiated through the display (e.g., through display cover layer 56 of FIG. 6). Sidewalls 102 may extend in the direction of central/longitudinal axis 109 (e.g., in the +Z direction). Central/longitudinal axis 109 may pass through the center of both the top and bottom surfaces of dielectric resonating element 92 (e.g., top surface 98 and bottom surface 100 of FIG. 6).

Similarly, radio-frequency transmission line 74H and feed probe 85H may convey radio-frequency signals of a second linear polarization orthogonal to the first polarization (e.g., a horizontal polarization). When driven using the second radio-frequency signals, feed probe 85H may excite one or more electromagnetic modes of dielectric resonating element 92 associated with the second polarization. When excited in this way, wave fronts associated with the second radio-frequency signals may propagate along the length of dielectric resonating element 92 and may be radiated through the display (e.g., through display cover layer 56 of FIG. 6). Both feed probes 85H and 85V may be active at once so that antenna 40 conveys both the first and second radio-frequency signals at any given time. In another suitable arrangement, a single one of feed probes 85H and 85V may be active at once so that antenna 40 conveys radio-frequency signals of only a single polarization at any given time.

Dielectric resonating element 92 may have a length 110, width 112, and height 114. Length 110, width 112, and height 114 may be selected to provide dielectric resonating element 92 with a corresponding mix of electromagnetic cavity/waveguide modes that, when excited by feed probes 85H and/or 85V, configure antenna 40 to radiate at desired frequencies. For example, height 114 may be 2-10 mm, 4-6 mm, 3-7 mm, 4.5-5.5 mm, 3-4 mm, 3.5 mm, or greater than 2 mm. Width 112 and length 110 may each be 0.5-1.0 mm, 0.4-1.2 mm, 0.7-0.9 mm, 0.5-2.0 mm, 1.5 mm-2.5 mm, 1.7 mm-1.9 mm, 1.0 mm-3.0 mm, etc. Width 112 may be equal to length 110 or, in other arrangements, may be different than length 110. Sidewalls 102 of dielectric resonating element 92 may contact the surrounding dielectric substrate (e.g., dielectric substrate 90 of FIG. 6). The dielectric substrate may be molded over feed probes 85H and 85V or may include openings, notches, or other structures that accommodate the presence of feed probes 85H and 85V. The example of FIG. 7 is merely illustrative and, if desired, dielectric resonating element 92 may have other shapes (e.g., shapes with any desired number of straight and/or curved sidewalls 102).

Feed conductors 84V and 84H may each have width 118 and height 116. Width 118 and height 116 may be selected to match the impedance of radio-frequency transmission lines 74V and 74H to the impedance of dielectric resonating element 92. As an example, width 118 may be between 0.3 mm and 0.7 mm, between 0.2 mm and 0.8 mm, between 0.4 mm and 0.6 mm, or other values. Height 116 may be between 0.3 mm and 0.7 mm, between 0.2 mm and 0.8 mm, between 0.4 mm and 0.6 mm, or other values. Height 116 may be equal to width 118 or may be different than width 118.

If desired, transmission lines 74V and 74H may include one or more transmission line matching stubs such as matching stubs 124 coupled to traces 122V and 122H. Matching stubs 124 may help to ensure that the impedance of radio-frequency transmission lines 74H and 74V are matched to the impedance of dielectric resonating element 92. Matching stubs 124 may have any desired shape or may be omitted. Feed conductors 84V and 84H may have other shapes (e.g., shapes having any desired number of straight and/or curved edges).

Antenna 40 may be a linear dielectric resonator antenna, as shown in the examples of FIGS. 6 and 7. A linear dielectric resonator antenna includes a single dielectric resonating element 92 having planar sidewalls (e.g., first and second opposing planar sidewalls and third and fourth opposing planar sidewalls orthogonal to the first and second opposing planar sidewalls). In practice, linear dielectric resonator antennas may exhibit limited bandwidth. As the number of frequencies covered by device 10 increases, it may be desirable to extend the bandwidth of the dielectric resonator antennas in device 10 without significantly increasing the size of the dielectric resonator antennas. To extend the bandwidth of the dielectric resonator antennas without significantly increasing antenna size, the dielectric resonator antennas may include non-linear dielectric resonator antennas. Non-linear dielectric resonator antennas may have non-planar sidewalls 102 and/or may include more than one stacked dielectric resonating element 92.

Figure 8:
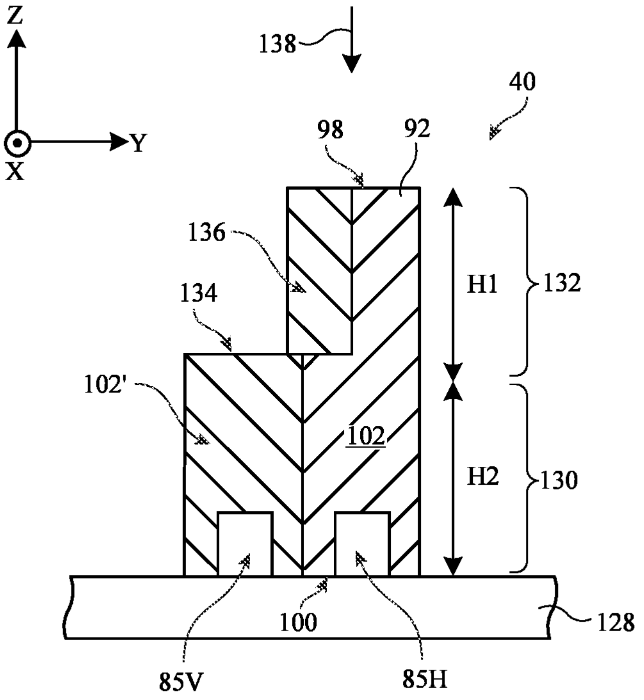
FIG. 8 is a side view of an illustrative dielectric resonator antenna having linear and stepped sidewalls in accordance with some embodiments.

For example, the non-planarity of sidewalls 102 may be in the form of a sidewall step (e.g., one or more of sidewalls 102 may be stepped sidewalls). FIG. 8 is a side view showing one example of how dielectric resonating element 92 may include stepped sidewalls. Dielectric resonating element 92 may be elongated along a longitudinal dimension such as a dimension along the z-axis and may therefore sometimes be referred to herein as a dielectric column.

As shown in FIG. 8, dielectric resonating element 92 may include a first portion 130 and a second portion 132 on top of portion 130. Portions 130 and 132 may be formed from an integral piece of dielectric block or may be formed from two pieces of dielectric block that are mounted to each other and fused together. Portions 130 and 132 may be formed from the same material or may be formed from different materials. Portion 130 may sometimes be referred to herein as a base portion of dielectric resonating element 92, while portion 132 may sometimes be referred to herein as a stepped portion of dielectric resonating element 92.

In the example of FIG. 8, portion 132 and portion 130 may share one or more planar sidewalls 102. In other words, a sidewall of portion 132 may be joined to a co-planar sidewall of portion 130 to form the shared planar sidewall. Dielectric resonating element 92 may have one or more stepped sidewalls across portions 130 and portion 132. In the example of FIG. 8, dielectric resonating element 92 may have a sidewall 102' at portion 130 and a sidewall 136 at portion 132. A step 134 may join sidewall 102' of portion 130 to sidewall 136 of portion 132. Configured in such as a manner, sidewall 102', step 134, and sidewall 146 may collectively form a stepped sidewall of dielectric resonating element 92. Sidewall 136 and shared sidewall 102 may be joined along an edge at portion 132, while sidewall 102' and shared sidewall 102 may be joined along an edge at portion 130.

As an example, sidewall 102' and sidewall 136 may be parallel to each other (e.g., may have respective surfaces that extend across parallel planes). Step 134 may be a flat surface that is perpendicular to the surfaces of sidewall 102' and sidewall 136. This example is merely illustrative. If desired, these surfaces (e.g., the non-linear sidewalls and the step therebetween) that form a stepped sidewall of dielectric resonating element 92 may have curved portions (e.g., along edges at which they join to other surfaces).

As further illustrated in FIG. 8, portion 130 may have a bottom surface 100 (e.g., bottom surface 100 of dielectric resonating element 92) that is mounted to a substrate 128 such as printed circuit board 72 as described in connection with FIGS. 6 and 7 or generally a printed circuit on which one or more dielectric resonating elements 92 are formed and on which feeding structures for the one or more dielectric resonating elements 92 are provided. The surface of step 134 may be on a top surface of portion 130 opposite bottom surface 100.

As shown in the example of FIG. 8, multiple feed probes such as feed probes 85V and 85H may be provided on sidewalls 102' and 102 of portion 130. Substrate 128 may provide electrical connections to feed probes 85V and 85H (e.g., as described in connection with FIGS. 6 and 7). If desired, a single feed probe or more than two feed probes may be provided instead of the two feed probes shown in FIG. 8.

Portion 132 may have a top surface 98 (e.g., top surface 98 of dielectric resonating element 92). Portion 132 may have a height H1 defined by a separation as measured parallel to the z-axis between the surface of step 134 and top surface 98. Portion 130 may have a height H2 defined by a separation as measured parallel to the Z-axis between the surface of step 134 and bottom surface 100. Height H1 may be equal to height H2 or may be different from height H2. The surface of step 134 may be parallel to top surface 98 and bottom surface 100.

While FIG. 8 shows one side of dielectric resonating element 92, dielectric resonating element 92 may have (reflectional) mirror symmetry across a central y-z plane through dielectric resonating element 92, if desired. This configuration is further illustrated in FIG. 9.

Figure 9:
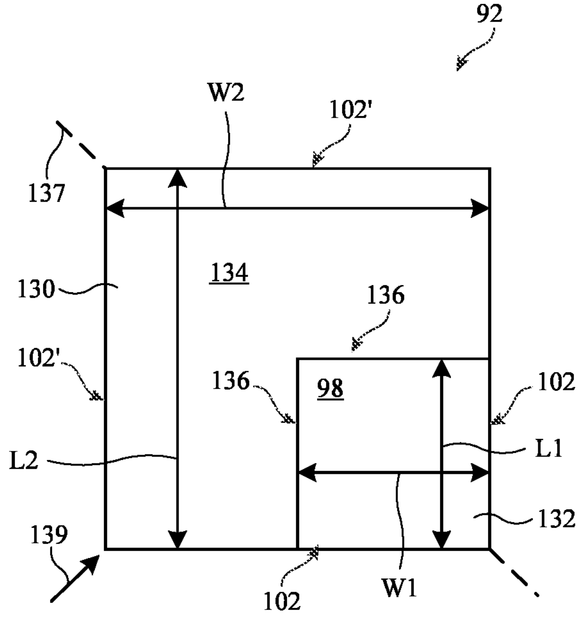
FIG. 9 is a plan view of an illustrative dielectric resonator antenna of the type shown in FIG. 8 in accordance with some embodiments.

FIG. 9 shows a top-down plan view of dielectric resonating element 92 (e.g., when viewing dielectric resonating element 92 of FIG. 8 in direction 138). In the example of FIG. 9, dielectric resonating element 92 may have mirror symmetry across the plane indicated by line 137 extending into and out of the page (e.g., the y-z plane in FIG. 8). In other words, the side view of dielectric resonating element 92 shown in FIG. 8 may be when viewing dielectric resonating element 92 of FIG. 9 in direction 139.

In the example of FIG. 9, portion 132 (as shown by the smaller rectangle) may have width W1 whereas portion 130 (as shown by the larger rectangle) may have width W2 that is different from width W1. Width W1 may be less than width W2. Portion 132 of dielectric resonating element 92 may also have length L1 whereas portion 130 has length L2 that is different from length L1. Length L1 may be less than length L2. Length L1 and width W1 may be the same or different. Length L2 and width W2 may be the same or different. The lengths and widths of portions 130 and 132 may be dimensions measured across the x-y plane, whereas the heights of portions 130 and 132 such as heights H1 and H2 in FIG. 8 may be a dimension measured parallel to the z-axis.

Dielectric resonating element 92 may include a single continuous planar step 134 connecting two sidewalls 102' (top and left sidewalls in the perspective of FIG. 9) at portion 130 to two corresponding sidewalls 136 (top and left sidewalls in the perspective of FIG. 9) at portion 132. Configured in this manner, these two sidewalls may form non-planar (e.g., may be stepped sidewalls) of dielectric resonating element 92 because they include step 134. Each sidewall 102' may remain planar within portion 130 itself. Each sidewall 136 may remain planar within portion 132 itself. Dielectric resonating element 92 may further include two sidewalls 102 (bottom and right sidewalls in the perspective of FIG. 9) that are planar across both portion 130 and portion 132.

Dielectric resonating element 92 may therefore have two planar sidewalls and two stepped sidewalls each connecting top surface 98 to bottom surface 100 (FIG. 8). A first planar sidewall may meet a second planar sidewall along an edge of dielectric resonating element 92. A first stepped sidewall may meet a second stepped sidewall along an edge of dielectric resonating element 92 (e.g., an edge at portion 130 and a separate edge at portion 132).

In the example of FIG. 9, step 134 may be located in adjacent first and second stepped sidewalls of dielectric resonating element 92 whereas the third and fourth adjacent sidewalls 102 may be free from step 134 (e.g., may be planar from bottom surface 100 to top surface 98 of dielectric resonating element 92). In other implementations, step 134 may be located in any combination of (e.g., all four of) the sidewalls of dielectric resonating element 92 in examples where dielectric resonating element 92 has a rectangular/square lateral outline from the perspective of FIG. 9. Put generally, the surface area of top surface 98 (e.g., the lateral area occupied by portion 132 in the x-y plane) may be less than the surface area of bottom surface 100 (e.g., the lateral area occupied by portion 130 in the x-y plane) for dielectric resonating element 92. Dielectric resonating element 92 (e.g., one or both of portions 130 and 132) may have a non-square lateral outline or other lateral outlines if desired.

In general, one or more electromagnetic resonating modes may be supported by portion 130 and one or more additional electromagnetic resonating modes may be supported by portion 132 of dielectric resonating element 92. The difference in the lateral dimensions of portions 132 and 130 (e.g., the presence of sidewall step 134) may configure dielectric resonating element 92 to exhibit expanded bandwidth across one or more bands. In some implementations, step 134 may configure portion 132 to radiate in one or more electromagnetic modes that cover a relatively high frequency band whereas portion 130 radiates in one or more electromagnetic modes that cover a relatively low frequency band.

In some illustrative arrangements described herein as an example, multiple dielectric resonator antennas 40 of the type shown in FIGS. 8 and 9 having dielectric resonating elements (e.g., dielectric columns) with one or more stepped sidewalls or generally non-linear sidewalls may be used to form a phased antenna array of antennas 40. In particular, the phased antenna array may include dielectric resonating elements 92 having different dimensions (e.g., different lengths, widths, and/or heights) to radiate at different frequencies.

Figure 10:
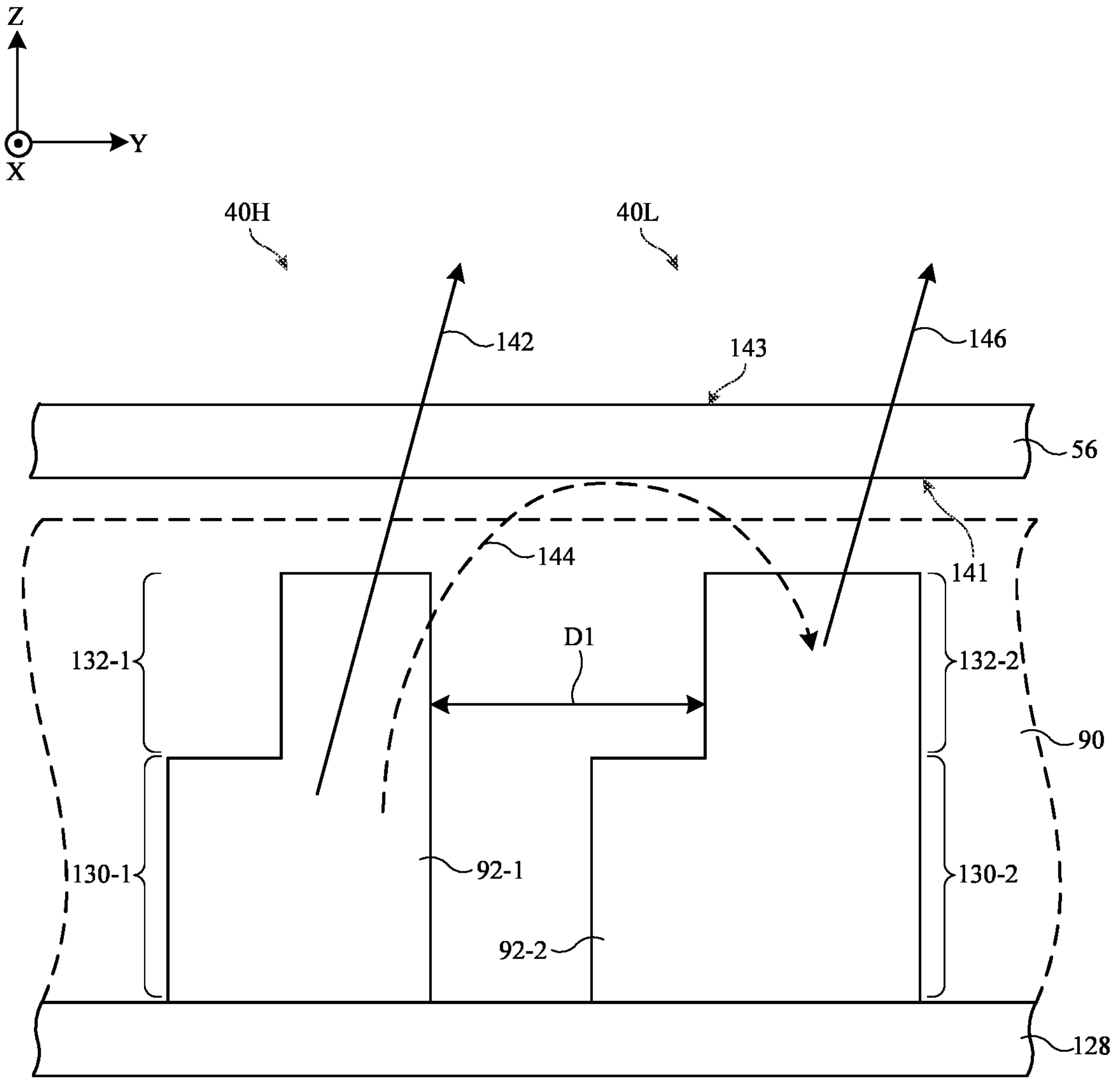
FIG. 10 is a side view of a pair of illustrative dielectric resonator antennas that can exhibit inter-coupling in accordance with some embodiments.

FIG. 10 is a side view of an illustrative antenna array having at least two antennas 40H and 40L. As shown in FIG. 10, antenna 40H may include dielectric resonating element 92-1 mounted to substrate 128 such as printed circuit board 72 (FIGS. 6 and 7) and antenna 40L may include dielectric resonating element 92-2 mounted to the same substrate 128. If desired, dielectric resonating elements 92-1 and 92-2 may be embedded within (e.g., laterally surrounded by) dielectric material 90 such as a molded plastic (e.g., injection-molded plastic) provided on substrate 128.

Dielectric resonating element 92-1 may include portion 130-1 and portion 132-1 (e.g., configured in the manner described for dielectric resonating element 92 in connection with FIGS. 8 and 9). Dielectric resonating element 92-2 may include portion 130-2 and portion 132-2 (e.g., configured in the manner described for dielectric resonating element 92 in connection with FIGS. 8 and 9).

Antenna 40H may be used to convey radio-frequency signals having a first set of frequencies. Antenna 40L may be used to convey radio-frequency signals having a second set of frequencies that are lower in frequency than at least some if not all of the first set of frequencies. To realize this difference in operating frequencies, dielectric resonating element 92-1 may generally have one or more dimensions (e.g., as measured across the x-y plane) that are smaller than the corresponding dimension of dielectric resonating element 92-2. As examples, the length (L1) of portion 132-1 may be less than the length (L1) of portion 132-2, the width (W1) of portion 132-1 may be less than the width (W1) of portion 132-2, the length (L2) of portion 130-1 may be less than the length (L2) of portion 130-2, and the width (W2) of portion 130-1 may be less than the width (W2) of portion 130-2. In the example of FIG. 10, the heights (as measured parallel to the z-axis) of portions 130-1 and 130-2 may be the same and the heights of portions 132-1 and 132-2 may be the same. If desired, the height of portion 130-1 may differ from the height of portion 130-2 and/or the height of portion 132-1 may different from the height of portion 132-2.

When the phased antenna array including antennas 40H and 40L are incorporated into an electronic device such as in region 66 of electronic device 10 as shown in FIG. 5, antennas 40H and 40L may convey radio-frequency signals through a dielectric cover layer such as display cover layer 56 or a dielectric antenna window in housing 12 of device 10. The cover layer may have an interior surface 141 facing an interior of device 10 and an exterior surface 143 facing an exterior of device 10.

In the example of FIG. 10, dielectric resonating element 92-1 of antenna 40H may transmit radio-frequency signal 142 through display cover layer 56. While some transmitted radio-frequency signals such as signal 142 may be desirable conveyed through cover layer 56, other transmitted radio-frequency signals such as signal 144 may be deflected by cover layer 56 (e.g., at interior surface 141). Deflected radio-frequency signal 14 may then be coupled into dielectric resonating element 92-2 (e.g., at portion 132-2) and may be undesirably conveyed by dielectric resonating element 92-2 as radio-frequency signal 146. In other words, dielectric resonating element 92-2 (e.g., portion 132-2) may be undesirably excited by deflected signals from dielectric resonating element 92-1 and serve as an unintentional and undesirable secondary radiator for dielectric resonating element 92-1. The presence of radio-frequency signal 146 may cause signal degradation at frequencies of radio-frequency signals 142 conveyed by dielectric resonating element 92-1 (e.g., destructive interference between radio-frequency signals 142 and 146).

Figure 11:
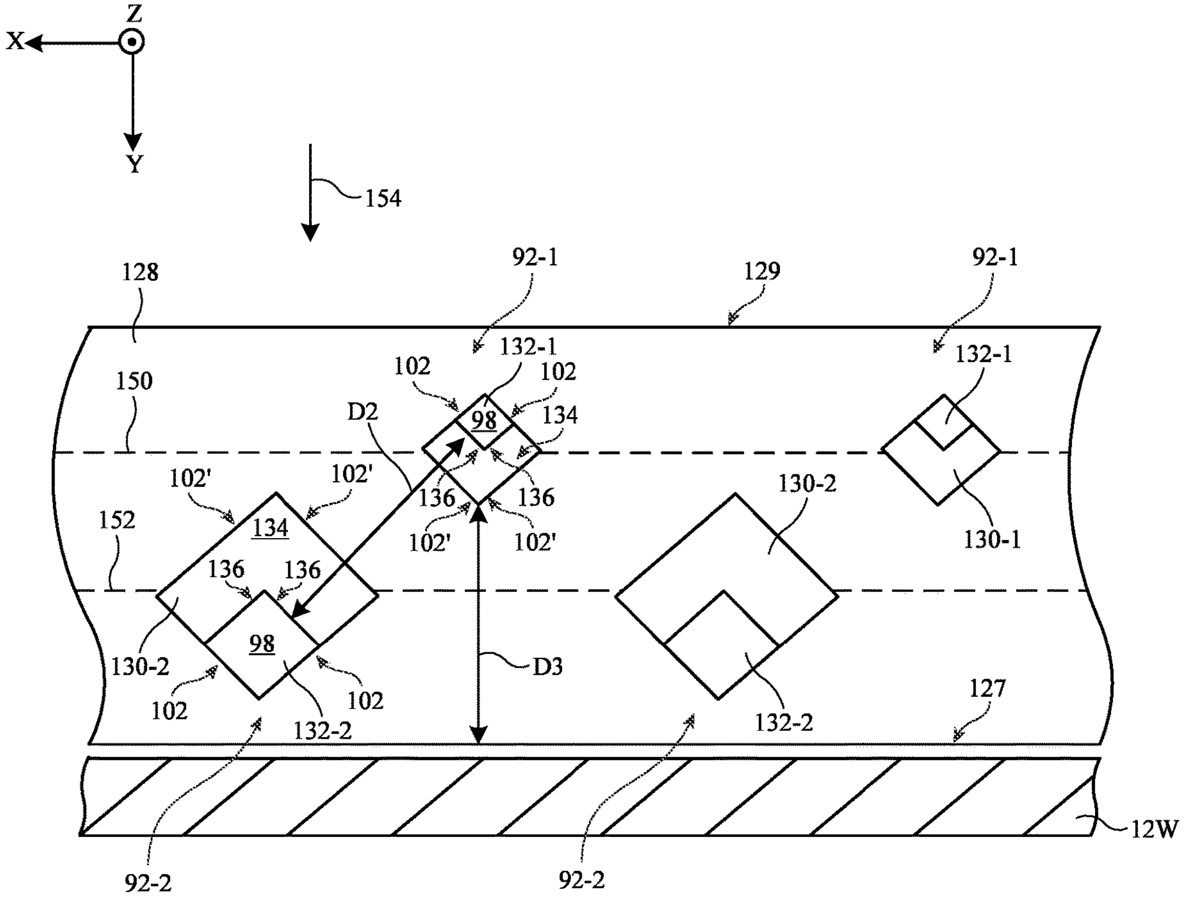
FIG. 11 is a plan view of an illustrative array of dielectric resonator antennas with interleaved dielectric resonator antennas in accordance with some embodiments.

To mitigate these issues, a phased antenna array having antennas 40H and antennas 40L may provide antennas 40H and antennas 40L in a staggered and interleaved arrangement. FIG. 11 is a plan view of an illustrative phased antenna array with staggered and interleaved antennas 40H and 40L. Antennas 40H and 40L may each include a dielectric resonating element implemented in the manner described in connection with FIGS. 8 and 9, but with two different types of physical dimensions to convey radio-frequency signals having varying frequencies.

In the example of FIG. 11, the antenna array may include at least two antennas 40H for conveying radio-frequency signals in a relatively high frequency band and two antennas 40L for conveying radio-frequency signals in a relatively low frequency band. If desired, the antenna array may include additional (or fewer) antenna(s) 40H and/or antenna (s) 40L. As examples, the antenna array may include one, three, four, five, or any other desired number of antennas 40H, may include one, three, four, five, or any other desired number of antennas 40L, and/or may include other types antennas 40.

As shown in FIG. 11, dielectric resonating elements 92 for antennas 40L and 40H may be mounted in a staggered (zig-zagging) and interleaved pattern on substrate 128. In particular, dielectric resonating elements 92-1 for antennas 40H may all be arranged along a first row. In the example of FIG. 11, geometric centers of the lateral outlines of dielectric resonating elements 92-1 for antennas 40H may all lie on line 150. Dielectric resonating elements 92-2 for antennas 40L may all be arranged along a second row offset from the first row. In the example of FIG. 11, geometric centers of the lateral outlines of dielectric resonating elements 92-2 for antennas 40L may all lie on line 152. In other words, neighboring dielectric resonating elements 92-1 and 92-2 may be offset along both the dimension parallel to the x-axis and the dimension parallel to the y-axis to form this staggered arrangement between the first and second rows.

Configured in this manner, dielectric resonating elements 92-1 and 92-2 may still run along the dimension parallel to the x-axis in a substantially linear manner (albeit with a minor offset along the y-axis between dielectric resonating elements 92-1 and dielectric resonating elements 92-2).

Portions 132-1 for dielectric resonating elements 92-1 may be oriented such that they are each disposed on the side of dielectric resonating element 92-1 most distant from its neighboring dielectric resonating element(s) 92-2. In particular, each stepped portion 132-1 may be provided at an edge of dielectric resonating element 92-1 along which adjacent planar sidewalls 102 meet. Portions 132-2 for dielectric resonating elements 92-2 may be oriented such that they are each disposed on the side of dielectric resonating element 92-2 most distant from its neighboring dielectric resonating element(s) 92-1. In particular, each stepped portion 132-2 may be provided at an edge of dielectric resonating element 92-2 along which adjacent planar sidewalls 102 meet.

As such, in the perspective of FIG. 11, portions 132-1 are located above line 150 and portions 132-2 are located below line 152. In this configuration, the planar sidewalls 102 shared between portions 130-1 and 132-1 face away from dielectric resonating element 92-2. Accordingly, the stepped sidewalls (e.g., sidewalls 102' and 136) of dielectric resonating element 92-1 face one or two neighboring dielectric resonating elements 92-2. Similarly, the planar sidewalls 102 shared between portions 130-2 and 132-2 faces away from dielectric resonating element 92-1. Accordingly, the stepped sidewalls (e.g., sidewalls 102' and 136) of dielectric resonating element 92-2 face one or two neighboring dielectric resonating elements 92-1.

Except for dielectric resonating elements 92 on the edge of the phased antenna array (e.g., at the ends of the first and second rows), each dielectric resonating element 92-1 may have two neighboring dielectric resonating elements 92-2 and each dielectric resonating element 92-2 may have two neighboring dielectric resonating element 92-1. Configured in the manner described above in connection with FIG. 11, each non-edge dielectric resonating element 92 may have a portion 132 that is most distant from portions 132 of its two neighboring dielectric elements 92.

As shown in FIG. 11, a distance D2 may separate each pair of adjacent portions 132 (e.g., a portion 132-1 of dielectric resonating element 92-1 and a portion 132-2 of dielectric resonating element 92-2). Distance D2 may have an x-dimension component (e.g., a separation as measured in a direction parallel to the x-axis) and a y-dimension component (e.g., a separation as measured in a direction parallel to the x-axis). Distance D2 may be greater than distance D1 in FIG. 10 separating portion 132-1 from portion 132-2 in the example of FIG. 10. As an example, in the arrangement of FIG. 10 where dielectric resonating elements 92-1 and 92-2 may be arranged in the same row, distance D1 may only have a y-dimension component and no x-dimension component.

Because the undesired reflected radio-frequency signals are coupled from portions 132-1 of dielectric resonating elements 92-1 for antennas 40H to portions 132-2 of dielectric resonating elements 92-2 for antennas 40L, the increased distance D2 provided in the arrangement shown in FIG. 11 may reduce coupling of reflected radio-frequency signals into portion 132 of neighboring dielectric resonating elements.

In configurations in which the phased antenna array of FIG. 11 is provided in region 66 in device 10 of FIG. 5, the antenna array (or the antenna module including the phased antenna array) may be oriented such that peripheral edge 127 of substrate 128 runs along and is adjacent to sidewall 12W in housing 12 of device 10. Dielectric resonating elements 92-1 may be formed closer to peripheral edge 127, whereas dielectric resonating elements 92-2 may be formed closer to an opposing peripheral edge 129 of substrate 128.

In the example of FIG. 11, each dielectric resonating elements 92-1 may have an edge along which the stepped side walls (e.g., sidewalls 102' of portion 130-1) meet. This edge of each dielectric resonating element 92-1 may be separated from housing sidewall 12W by distance D3. Each dielectric resonating element 92-2 may have an edge along which sidewalls 102 meet. This edge of each dielectric resonating element 92-2 may be separated from housing sidewall 12W by a distance less than distance D3.

Configured in this manner, radio-frequency signals conveyed by dielectric resonating elements 92-1 for antennas 40H may be less susceptible to obstruction by housing sidewall 12W due to the increased distance D3 separating dielectric resonating elements 92-1 from sidewall 12W. In other words, distance D3 may be greater than a distance separating dielectric resonating elements 92-1 from sidewall 12W in scenarios where dielectric resonating elements 92-1 are arranged in the same second row as dielectric resonating elements 92-2 (e.g., along line 152).

Figure 12:
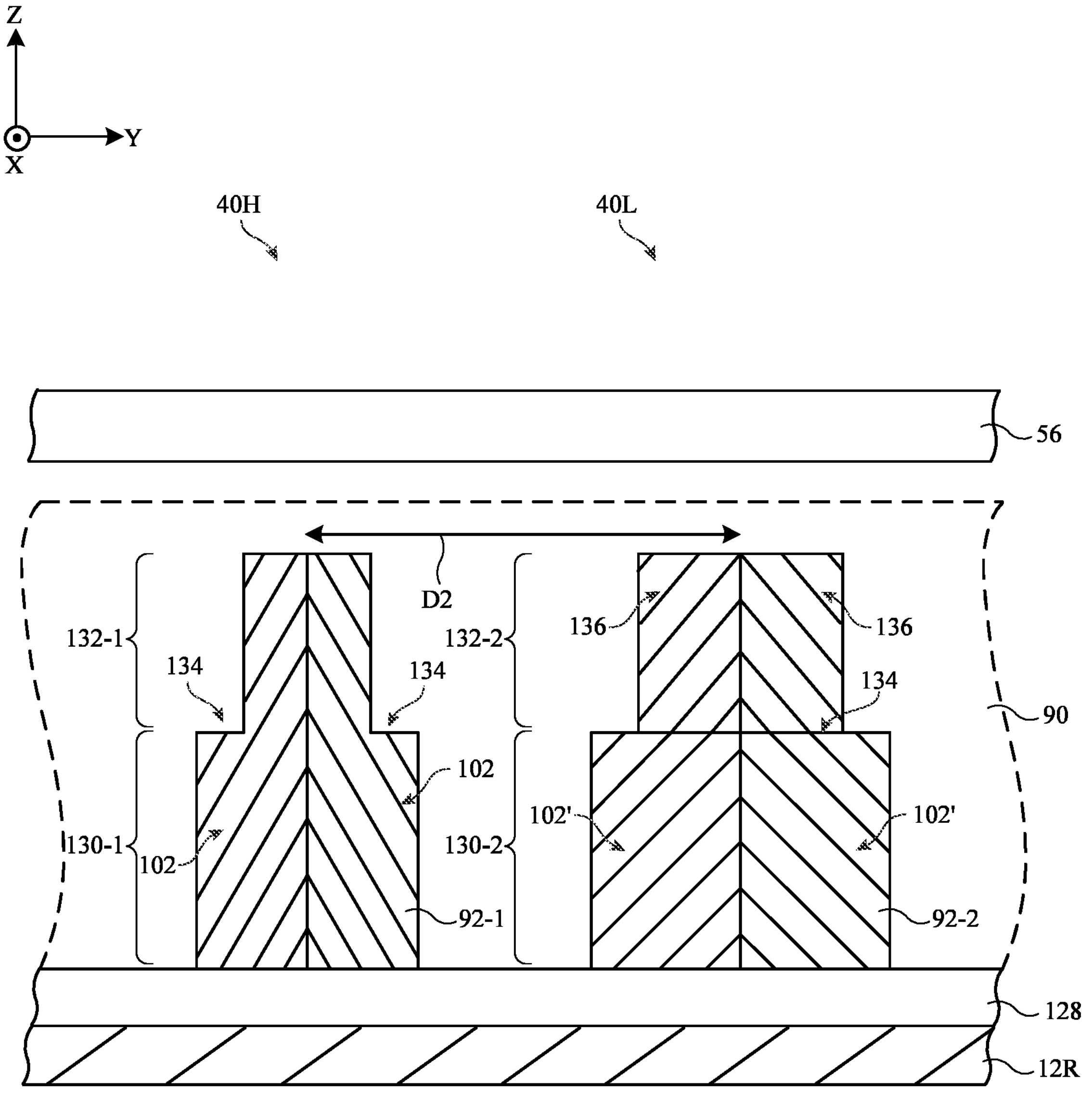
FIG. 12 is a side view of an illustrative neighboring pair of dielectric resonator antennas that has a separation between respective stacked portions in accordance with some embodiments.

FIG. 12 is a side view of an illustrative pair of neighboring dielectric resonating elements 92-1 and 92-2 (e.g., when viewing a pair of neighboring dielectric resonating elements 92 of FIG. 11 in direction 154). As shown in FIG. 12, dielectric resonating elements 92-1 and 92-2 (and additional dielectric resonating elements in the same antenna array as shown in FIG. 11) may be embedded within dielectric material 90 such as a molded plastic provided on substrate 128, if desired. Substrate 128 may be mounted to an electronic device housing wall such as rear housing wall 12R of device 10 (e.g., when placed in region 66 of device 10 in FIG. 5).

As illustrated by the side view of FIG. 12, dielectric resonating element 92-1 may have two planar sidewalls 102 that face out of the page and that meet along an edge of dielectric resonating element 92-1 most distant as measured in a dimension along the x-axis from dielectric resonating element 92-2. Dielectric resonating element 92-1 may have two stepped sidewalls that face into the page. One of the two stepped sidewalls of dielectric resonating element 92-1 may face neighboring dielectric resonating element 92-2 and the other one of the two stepped sidewalls of dielectric resonating element 92-1 may face another neighboring dielectric resonating element 92-2 (if present).

Dielectric resonating element 92-2 may have two stepped sidewalls that face out of the page. Dielectric resonating element 92-2 may have two planar or linear sidewalls 102 that face into the page and that meet along an edge of dielectric resonating element 92-2 most distant as measured in a dimension along the x-axis from dielectric resonating element 92-1. One of the two stepped sidewalls of dielectric resonating element 92-2 may face neighboring dielectric resonating element 92-1 and the other one of the two stepped sidewalls may face another neighboring dielectric resonating element 92-1 (if present).

When dielectric resonating element 92-1 conveys radio-frequency signals through dielectric cover layer 56, due to the increased separation between portions 132-1 and 132-2 (e.g., a distance D2 having substantive x- and y-components), signals conveyed by dielectric resonating element 92-1 and deflected by cover layer 56 may be less likely to couple into dielectric resonating element 92-2 (e.g., at portion 132-2).

If desired, instead of or in addition to arranging dielectric resonating elements in a staggered and interleaved manner as described in connection with FIGS. 11 and 12, cover layer 56 may be modified to reduce the deflection of radio-frequency signals.

Figure 13:
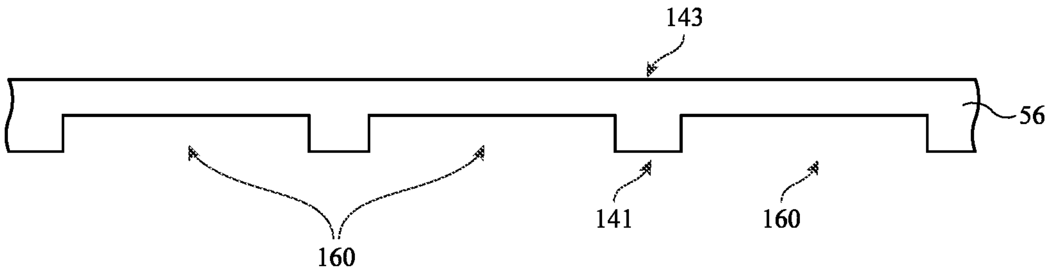
FIG. 13 is a side view of an illustrative cover layer with corrugations in accordance with some embodiments.
Figure 14:
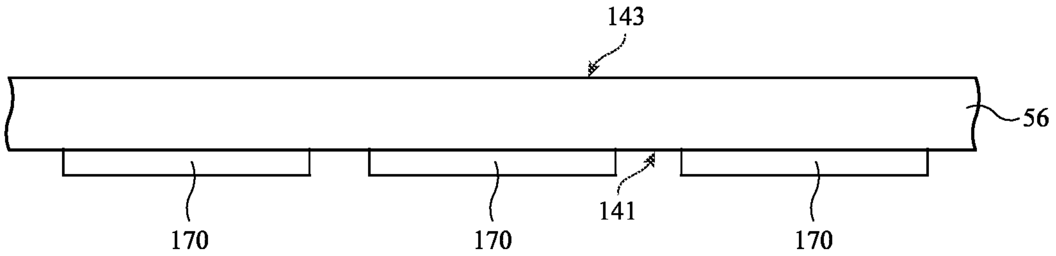
FIG. 14 is a side view of an illustrative cover layer with impedance matching material in accordance with some embodiments.

As one example shown in FIG. 13, cover layer 56 may be provided with corrugations 160 along at interior surface 141. Corrugations 160 may be provided at a region of cover layer 56 overlapping the phased antenna array of dielectric resonating elements 92 (e.g., overlapping dielectric resonating elements 92-1 for antennas 40H and/or overlapping dielectric resonating elements 92-2 for antennas 40L). If desired, cover layer 56 may have a locally thinned region (e.g., a single continuous depression or indentation) overlapping the antenna array of dielectric resonating elements 92 (e.g., overlapping dielectric resonating elements 92-1 for antennas 40H and/or overlapping dielectric resonating elements 92-2 for antennas 40L). Providing thinner portion(s) in one or more regions of cover layer 56 overlapping the phased antenna array relatively to surrounding thicker regions of cover layer 56 may configure cover layer 56 to reduce deflection of radio-frequency signals (e.g., reduce signals 144 in FIG. 10).

As another example shown in FIG. 13, cover layer 56 may be provided with matching material or matching layers 170 at interior surface 141. The matching layers may be provided at regions on cover layer 56 overlapping the phased antenna array of dielectric resonating elements 92 (e.g., overlapping dielectric resonating elements 92-1 for antennas 40H and/or overlapping dielectric resonating elements 92-2 for antennas 40L). Each matching layer 170 may include any suitable number of matching materials stacked on top of one another. By providing matching layer 170 at interior surface 141, cover layer 56 to produce reduce deflection of radio-frequency signals (e.g., reduce signals 144 in FIG. 10).

Figure 15:
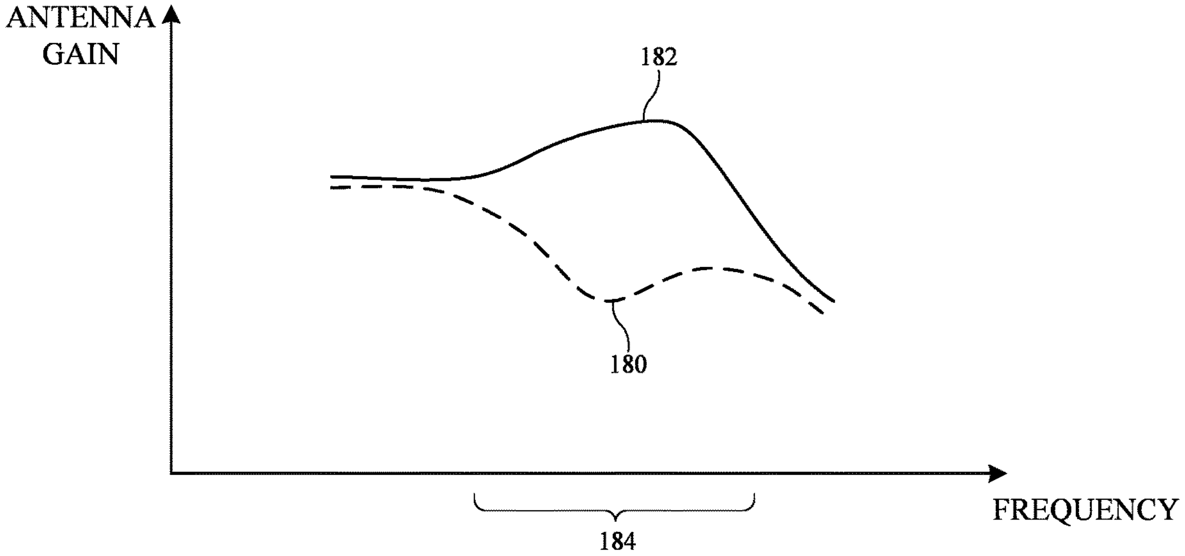
FIG. 15 is a plot of antenna system performance (gain) as a function of frequency showing how illustrative dielectric resonator antennas of the type shown in FIGS. 11 and 12 may exhibit higher system gain than dielectric resonator antennas of the type shown in FIG. 10 in accordance with some embodiments.

FIG. 15 is a plot of antenna performance (e.g., antenna gain) as a function of frequency showing how a staggered and interleaved arrangement of dielectric resonating elements (e.g., as shown in FIG. 11) can improve antenna gain for an antenna such as antenna 40H. Curve 180 plots the response of antenna 40H when provided in antenna array having antenna 40L in an arrangement of the type described in connection with FIG. 10 (e.g., when antennas 40H and 40L are provided in a same row). Curve 182 plots the response of antenna 40H when provided in antenna array having antenna 40L in an arrangement of the type described in connection with FIG. 11 (e.g., when antennas 40H and 40L are provided in offset rows with maximum separation between stepped portions 132) and/or with one or more modifications to the overlapping region of cover layer 56 of the type described in connection with FIGS. 13 and/or 14.

Antenna 40H may radiate in a frequency band 184 (e.g., a frequency band including frequencies between around 37 GHz and 40 GHz). As shown in FIG. 15, curve 182 may exhibit higher antenna gain for frequency band 184 than that exhibited by curve 180. This improvement in antenna gain may be due to decreased destructive interference caused by secondary radiation of adjacent antennas 40L (e.g., due to increased distances between stepped portions 132 of antennas 40H and 40L, due to reduced deflection at cover layer 56, etc.), decreases antenna obstruction caused by increased distances between antennas 40H and an electronic device sidewall, etc.

Some transmission line structures and feed structures (e.g., feed probes) have been omitted from some of FIGS. 8-12 in order to not unnecessary obscure the embodiments described therein. In general, each of dielectric resonating elements 92 (e.g., dielectric resonating elements 92-1 for antennas 40H and dielectric resonating elements 92-2 for antennas 40L) in FIGS. 8-12 may include its own set of feed probes and other feed structure and transmission line structures as described in connection with FIGS. 6 and 7. To provide multiple polarizations, multiple feed probes on adjacent sidewalls, other feed structures, and transmission line structures (e.g., as shown in FIGS. 7 and 8) may be provided for each dielectric resonating element 92 in FIGS. 8-12. If desired, a single polarization configuration may be implemented for one or more of dielectric resonating elements 92 in FIGS. 8-12.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a housing;

a dielectric cover layer on the housing;

a printed circuit; and a phased antenna array having a plurality of dielectric columns staggered between first and second rows and mounted to the printed circuit, a given dielectric column in the plurality of dielectric columns including a non-planar sidewall and being configured to radiate at a frequency greater than 10 GHz through the dielectric cover layer, wherein the given dielectric column includes a first portion, a second portion, and a step that connects a first sidewall of the first portion and a second sidewall of the second portion.

2. The electronic device of claim 1, wherein the given dielectric column includes a surface at which the given dielectric column is mounted to the printed circuit, the first portion having a first width, and the second portion having a second width less than the first width, the first portion being interposed between the second portion and the surface of the given dielectric column.

3. The electronic device of claim 2, wherein the given dielectric column has an additional non-planar sidewall, the additional non-planar sidewall of the given dielectric column being formed from additional sidewalls of the first and second portions and from the step.

4. The electronic device of claim 2, wherein the step of the given dielectric column is on a first side of the first portion and the surface is on a second side of the first portion opposite the first side.

5. The electronic device of claim 1, wherein the given dielectric column is in the first row and the non-planar sidewall of the given dielectric column in the first row faces a corresponding dielectric column in the second row.

6. The electronic device of claim 5, wherein the corresponding dielectric column has a non-planar sidewall that faces the given dielectric column in the first row.

7. The electronic device of claim 1, wherein the given dielectric column includes a planar sidewall across the first and second portions.

8. The electronic device of claim 7, wherein the given dielectric column is in the first row and the planar sidewall of the given dielectric column a corresponding in the first row faces away from dielectric column in the second row.

9. The electronic device of claim 8, wherein the corresponding dielectric column has a planar sidewall that faces away from the given dielectric column in the first row.

10. The electronic device of claim 1, wherein the housing includes a conductive sidewall to which the dielectric cover layer is mounted, the plurality of dielectric columns are staggered in the first and second rows along the conductive sidewall, at least one dielectric column in the second row is separated from the conductive sidewall by a first distance, and at least one dielectric column in the first row is separated from the conductive sidewall by a second distance greater than the first distance.

11. The electronic device of claim 10, wherein the at least one dielectric column in the first row is configured to radiate at the frequency through the dielectric cover layer, the at least one dielectric column in the second row is configured to radiate at an additional frequency greater than 10 GHZ, and the additional frequency is less than the frequency.

12. The electronic device of claim 1, wherein at least one dielectric column in the first row is configured to radiate at an additional frequency through the dielectric cover layer, at least one dielectric column in the second row is configured to radiate at the frequency, and the frequency is less than the additional frequency.

13. The electronic device of claim 1, further comprising:

a display mounted to the housing, wherein the dielectric cover layer comprises a display cover layer for the display.

14. The electronic device of claim 1, wherein the first sidewall of the first portion is a first planar sidewall and the second sidewall of the second portion is a second planar sidewall.

15. The electronic device of claim 1, wherein the given dielectric column has an additional non-planar sidewall that meets the non-planar sidewall along an edge of the given dielectric column.

16. The electronic device of claim 1, wherein the given dielectric column is in the first row, and an additional dielectric column in the plurality of dielectric columns is in the second row and has a non-planar sidewall.

17. The electronic device of claim 1, wherein the given dielectric column is in the first row, and an additional dielectric column in the plurality of dielectric columns is in the first row and has a non-planar sidewall.

18. The electronic device of claim 1, wherein the given dielectric column has a top surface at the second portion and has a bottom surface at the first portion, and the step is between the top surface and the bottom surface.

19. The electronic device of claim 18, wherein the step comprises a surface that is parallel to the top and bottom surfaces.

20. The electronic device of claim 1, further comprising:

a feed probe coupled to the first sidewall of the first portion and configured to excite the given dielectric column to radiate at the frequency.

* * * * *